(12) United States Patent
Meeth

(10) Patent No.: US 6,237,208 B1
(45) Date of Patent: May 29, 2001

(54) PROCESS FOR PRODUCING PROFILED MATERIALS, IN PARTICULAR FOR DOOR AND WINDOW PRODUCTION

(76) Inventor: Ernst-Josef Meeth, Josef-Meeth-Strasse 1, D-54531 Wallscheid (DE)

( * ) Notice: Subject to any disclaimer, the term of this patent is extended or adjusted under 35 U.S.C. 154(b) by 0 days.

(21) Appl. No.: 09/025,119

(22) Filed: Feb. 17, 1998

Related U.S. Application Data

(63) Continuation-in-part of application No. PCT/EP96/03611, filed on Aug. 16, 1996.

(30) Foreign Application Priority Data

Aug. 17, 1995 (DE) .............................. 195 30 270

(51) Int. Cl.$^7$ ...................................... B07B 13/00
(52) U.S. Cl. ................... 29/403.1; 264/911; 264/918; 264/916; 264/112; 264/113; 264/115
(58) Field of Search .................... 264/911, 113, 264/115, 112, 918, 916; 29/403.1

(56) References Cited

U.S. PATENT DOCUMENTS

| | | |
|---|---|---|
| 3,689,180 | 9/1972 | Damsky et al. . |
| 3,981,653 | * 9/1976 | Greenhulgh . |

(List continued on next page.)

FOREIGN PATENT DOCUMENTS

| | | |
|---|---|---|
| 2 106 649 | 3/1994 | (CA) . |
| 642 901 | 5/1984 | (CH) . |
| 610 557 | 7/1935 | (DE) . |
| 36 14 533 A1 | 11/1987 | (DE) . |
| 36 16 444 A1 | 11/1987 | (DE) . |
| 35 33 225 C2 | 3/1991 | (DE) . |
| 41 40 146 A1 | 6/1992 | (DE) . |
| 42 27 018 A1 | 3/1993 | (DE) . |
| 2 579 926 | 10/1986 | (FR) . |
| 2 087 307 | 5/1982 | (GB) . |
| 2 173 563 | 10/1986 | (GB) . |
| 3028252 | 2/1991 | (JP) . |
| 3149244 | 6/1991 | (JP) . |
| 887 213 | 12/1981 | (SU) . |

OTHER PUBLICATIONS

R. Liebold, "Kunststoffberater" ["Plastics Consultant"] (Dec., 1994); pp. 28–33.
U. Berghaus, "Plastverarbeiter" ["Plastics Molder"], V. 44, No. 10 (1993); pp. 107, 108, 110, 112, 114, 115.
K. W. Steiner, "Kunststoffe" ["Plastics"], 74 (1984) 4, pp. 186 to 194.
U. Hoffmann, M. Gebaurer, "Kunststoffe" ["Plastics"], 83 (1993) 4, pp. 259–263.
A. Lappe et al., "Plastverarbeiter" ["Plastics Molder"], 45 (1994), No. 5, pp. 32 to 34, 37.
Th. Fölster et al., "Kunststoffe" ["Plastics"], 83 (1993) 9, pp. 687 to 691.
J. Bolton, "Kunststoffberater" ["Plastics Molder"], Jun., 1991, pp. 39–41.
James Bolton, Swiss publication "TR Technische Rundschau" ["TR Technical Survey"] (1992); pp. 52–53.

*Primary Examiner*—S. Thomas Hughes
*Assistant Examiner*—Steve Blount
(74) *Attorney, Agent, or Firm*—Baker Botts L.L.P.

(57) ABSTRACT

A process for the manufacture of section material composed of thermoplastic material, such sections being suitable for the production of door and window jambs and frames. A thermoplastic material component and a second component containing additives are mixed and compacted to form a strand-forming mixture. In so doing, the thermoplastic component is thermally plasticised. The strand-forming mixture is formed into section material, which may then be further machined, shaped and coated to form the final product.

100 Claims, 18 Drawing Sheets

U.S. PATENT DOCUMENTS

| | | |
|---|---|---|
| 4,020,202 | 4/1977 | Kreft . |
| 4,033,804 * | 7/1977 | Baldya . |
| 4,073,661 * | 2/1978 | Buzga . |
| 4,247,508 | 1/1981 | Housholder . |
| 4,546,022 | 10/1985 | Madonia Ciro et al. . |
| 4,820,469 * | 4/1989 | Walsh . |
| 5,087,189 | 2/1992 | Jeanneret . |
| 5,133,124 * | 7/1992 | Burroughs . |
| 5,236,655 * | 8/1993 | de Soet . |
| 5,406,768 * | 4/1995 | Giuseppe . |
| 5,424,013 * | 6/1995 | Lieberman . |
| 5,468,431 * | 11/1995 | Helling . |
| 5,498,384 | 3/1996 | Volk et al. . |
| 5,516,472 * | 5/1996 | Lauer . |
| 5,534,207 * | 7/1996 | Burrus . |
| 5,635,248 * | 6/1997 | Hsu . |
| 5,925,296 * | 7/1999 | Leese . |

\* cited by examiner

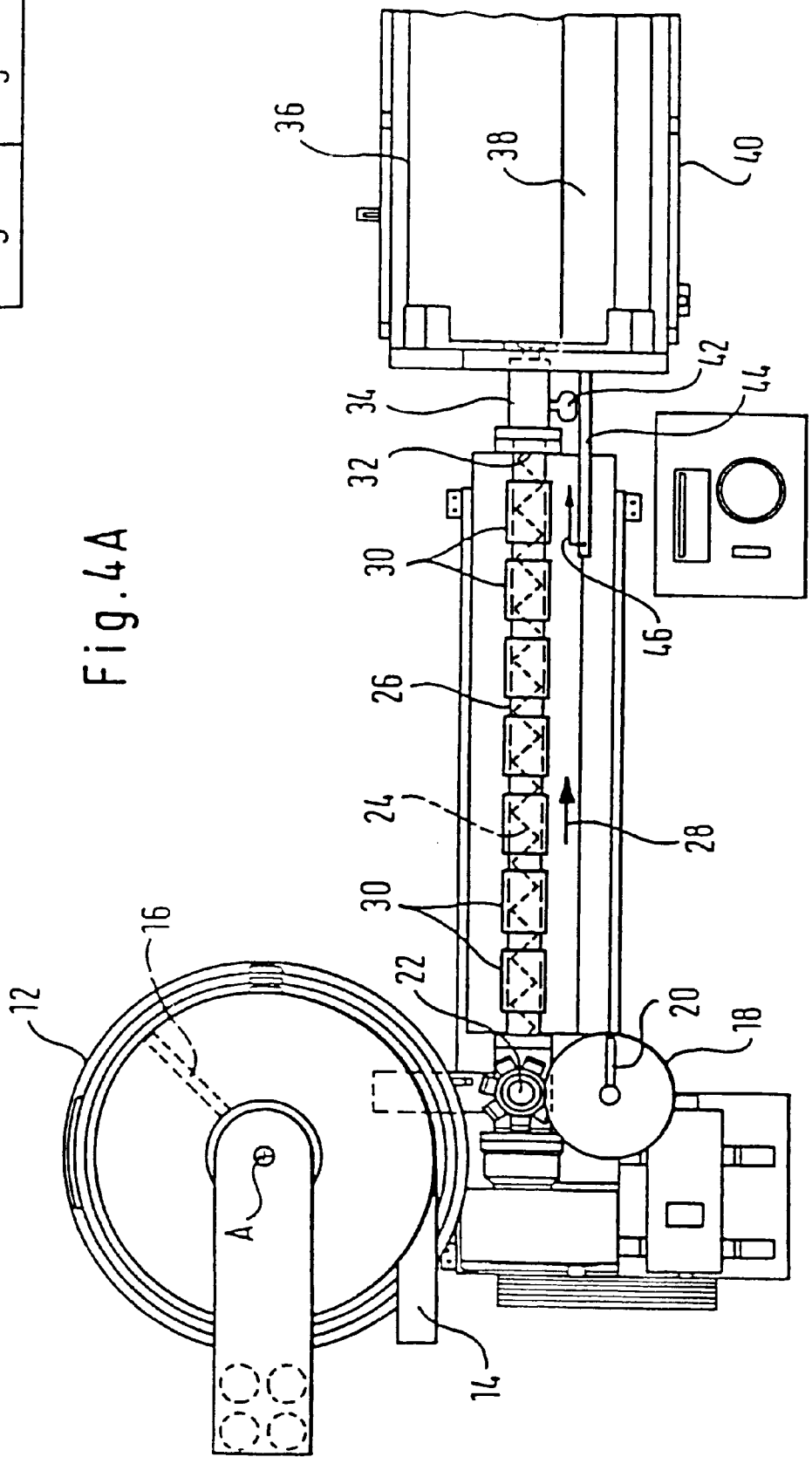

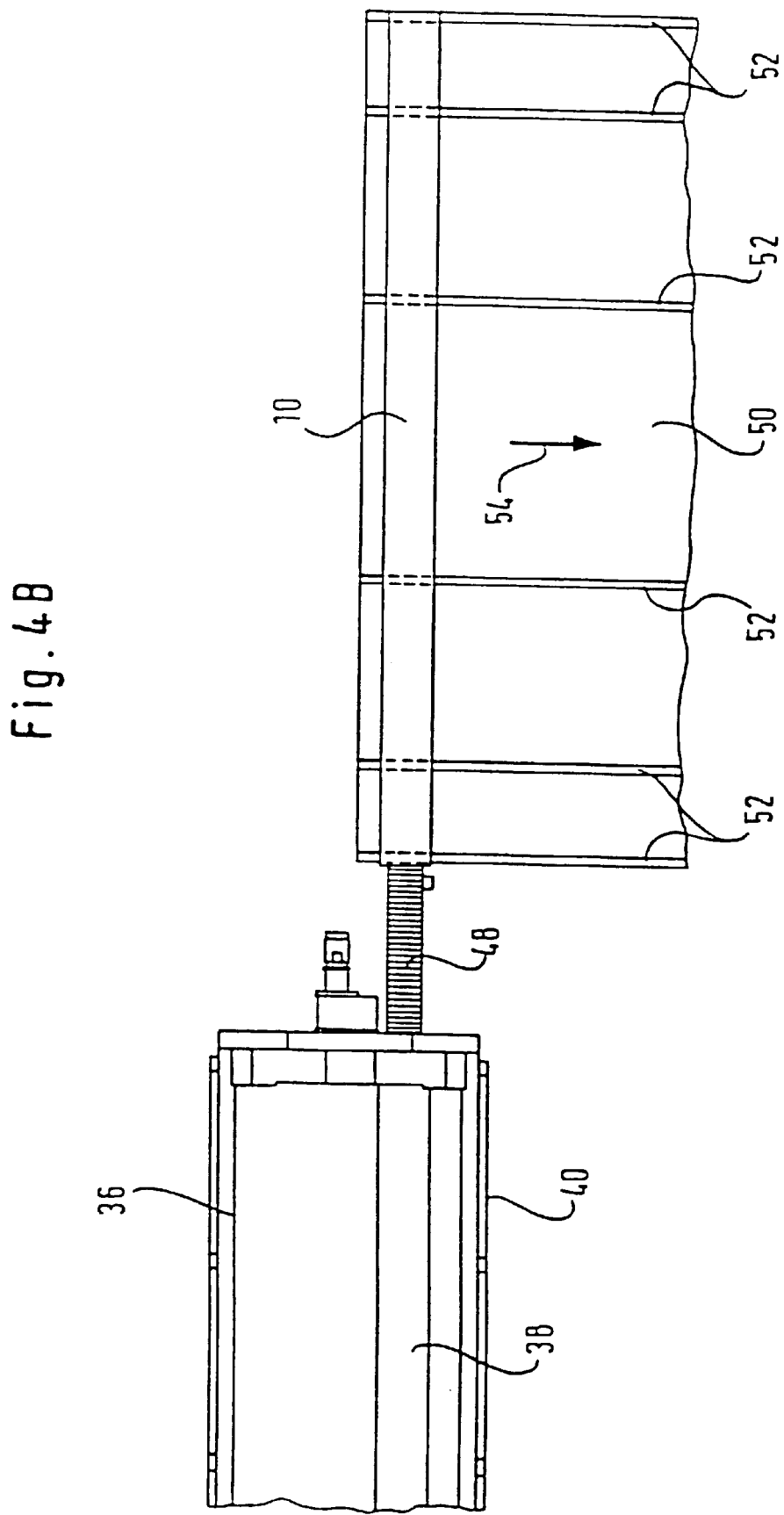

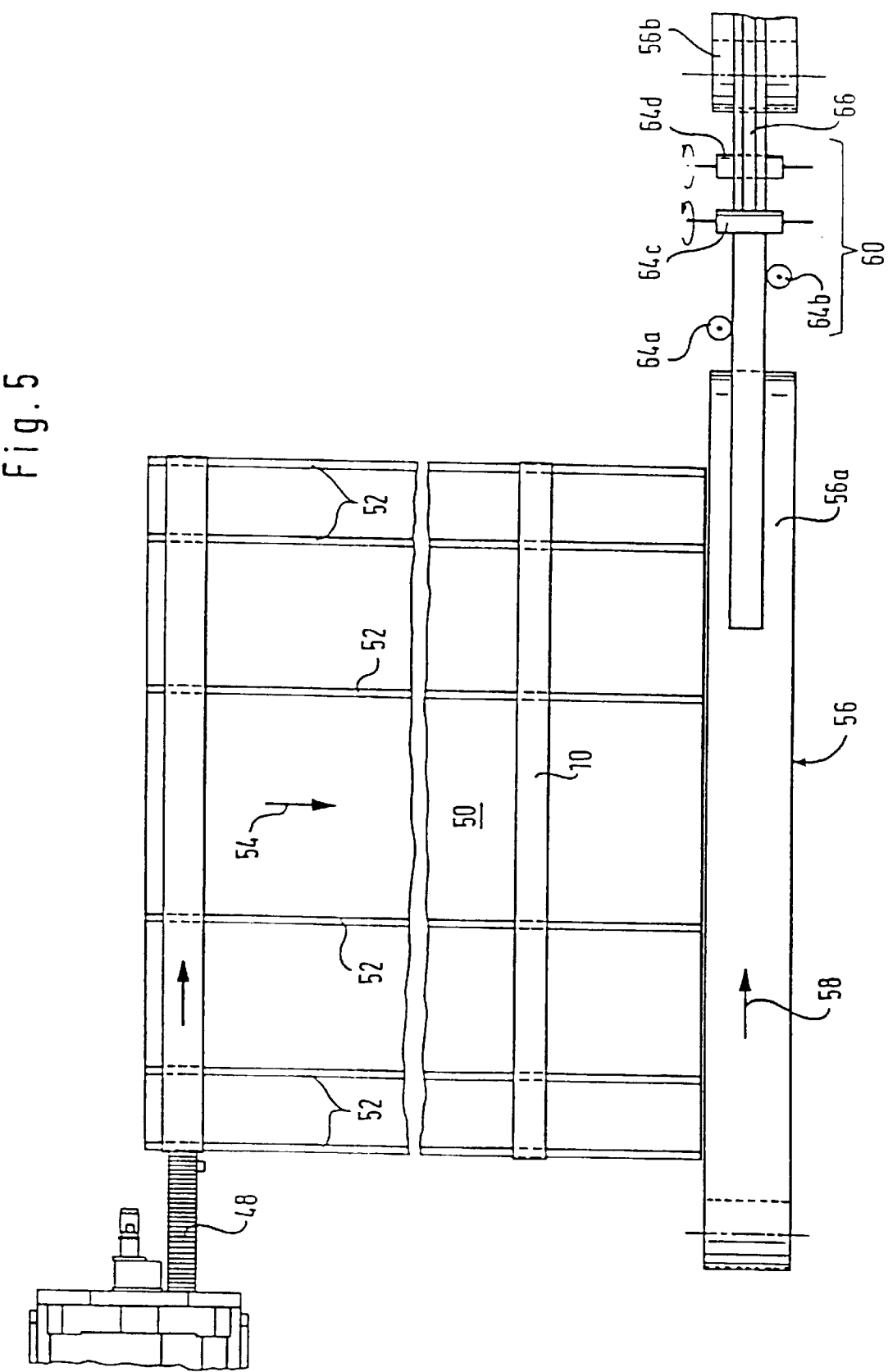

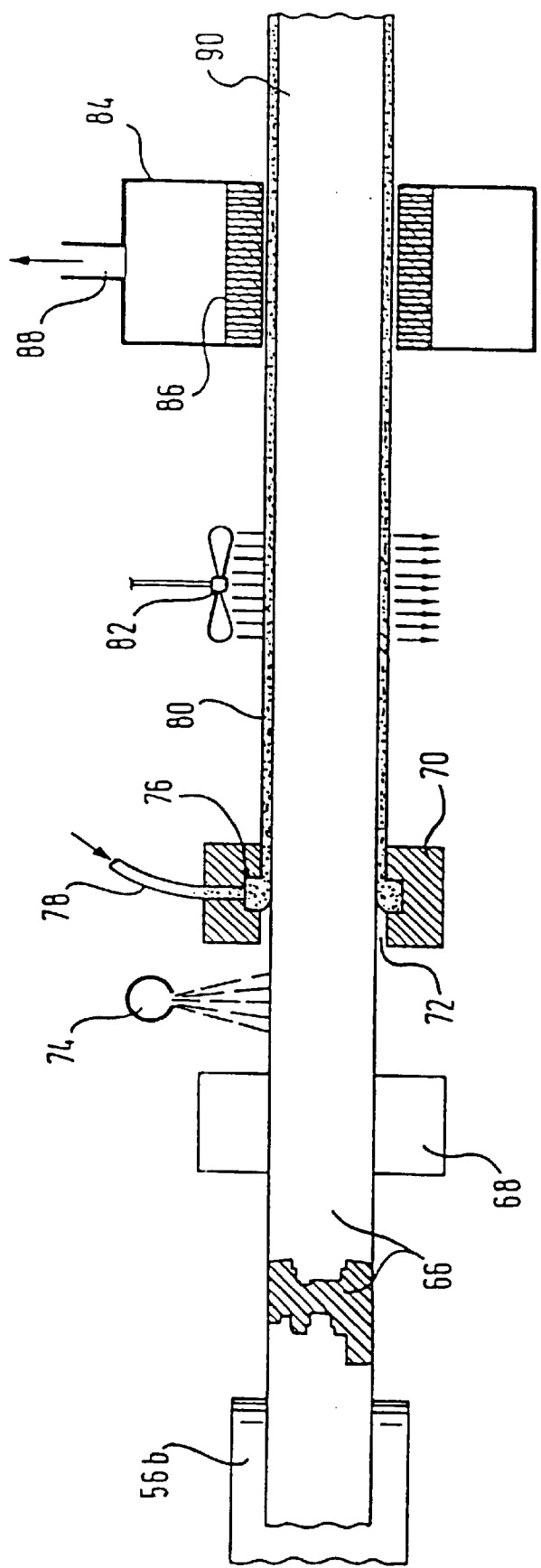

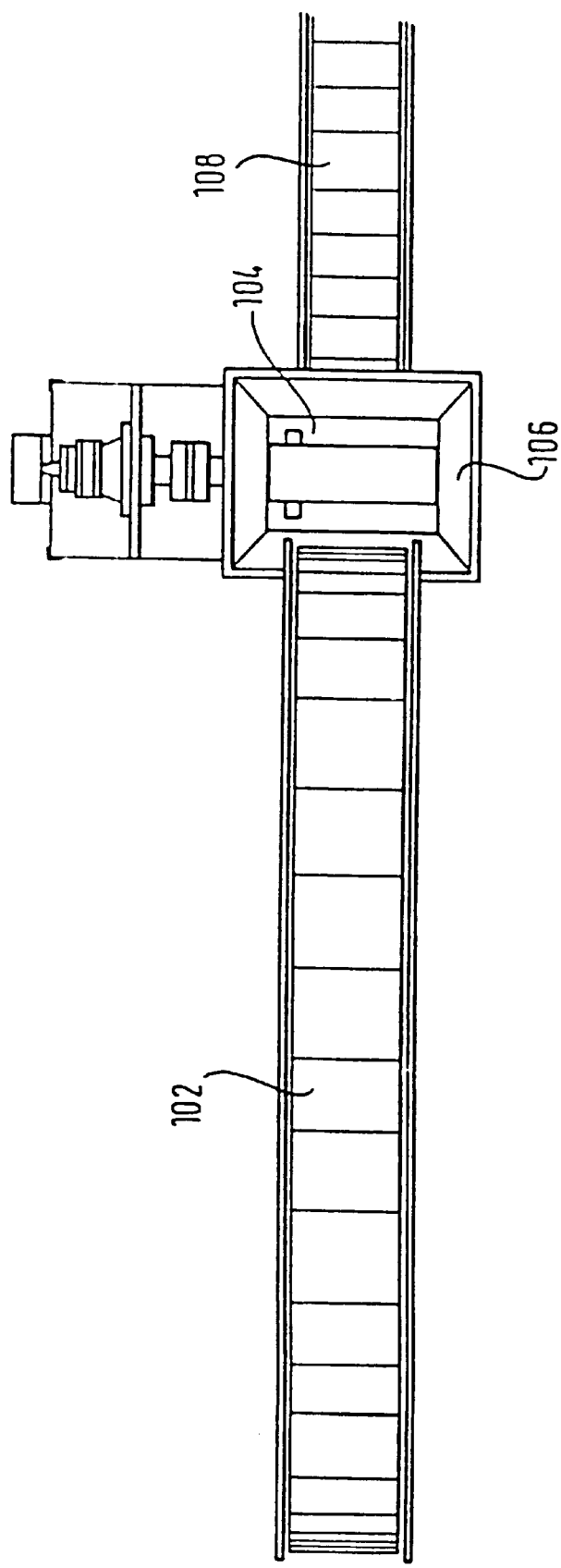

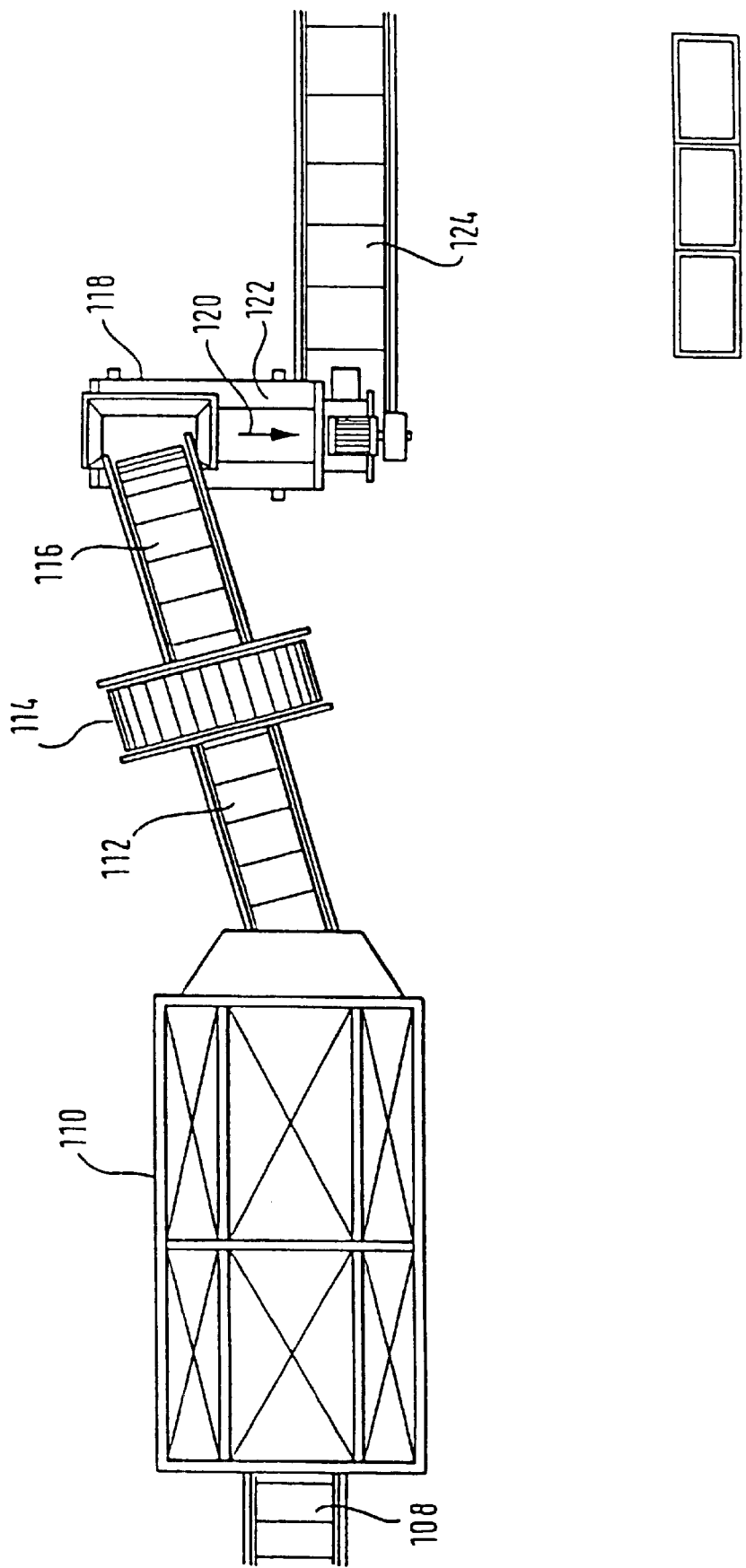

PROCESS FOR PRODUCING PROFILED MATERIALS, IN PARTICULAR FOR DOOR AND WINDOW PRODUCTION

This application is a C-I-P of PCT/EP 96/03611, filed Aug. 16, 1996.

BACKGROUND

1. Field of the Invention

This invention relates to a process for the manufacture of and optionally for the further processing of section material, suitable for the production of doors and windows, using a thermoplastic material by thermally plasticising the material and by extrusion forming said thermoplasticised matter comprising the following measures:

a) a first blending component made of thermplastic plastics waste;

b) providing a second blending component with a content of additives;

c) the first and the second blending component are thoroughly mixed, compacted and mixed by means of thermally plasticising of said first blending component to form a strand-forming mixture.

2. The Prior Art

In the traditional production of doors and windows, the legs of the sections forming the window casement and the window frame are regularly produced by machining wood. At the conclusion of the machining operation, the section legs are ready to be assembled to form window casements and window frames.

In addition, it has been known for many years to produce section material for the manufacture of window casements and window frames in the production of doors and windows made of thermoplastic plastics by extrusion. To this end the thermoplastic plastics, optionally PVC, is pressed through an extrusion die by means of a screw-type extruder, a thermoplastic state of the plastic being achieved prior to the passage through the extrusion die and the strand emerging from the die being cooled downstream of the die. The typical feature of this process is that the section material from the extrusion die that is obtained and cooled, if necessary, intermediately stored, is ready for further processing to form window casements and window frames.

It is also known to extrude section material for the manufacture of window casements and window frames from light metal. In so doing the light metal is driven through a drawing die while being subjected to cold forming. The section material obtained at the outlet of the drawing die is first cooled from the temperature attained by the heat of the forming operation to ambient temperature and is then further processed to form window casements and window frames.

It is common to all known processes that the sections are achieved in a single section forming operation by milling and/or glueing in the case of wood working, by extruding the plastic in the case of plastics processing, and also by extruding in the processing of light metal.

Each of these known processes has its advantages and its drawbacks.

When wood is used as a starting material solid sections are obtained, as a rule, by machining operations and are suitable for producing window casements and window frames without any reinforcing measures. The fittings for connecting window casements and window frames and any and all fittings for installing the window frames in wall openings can be attached to any location on the respective window casement and window frame by the use of wood screws or nails. The disadvantage is that the wood, even when it is thoroughly dried, exhibits considerable, long-term shrinkage which occurs at least in part after the completion of the respective window and/or respective door and even after installation into the respective wall opening, the consequence being that leakage and binding can occur between window casement and window frame, thus making subsequent adjustment necessary. In addition, plaster damage or cracks can occur in those areas where the window frames abut against the masonry. Yet another disadvantage is that the wood requires surface treatment, optionally weatherproofing, which must be repeated several times during the service life of the window casements and window frames.

The manufacture of window casements and window frames from light metals is very expensive. Window casements and window frames made of light metal are usually only used in buildings of high quality. The good thermal conductivity of light metal requires extensive measures to avoid thermal bridges and cold bridges between the exterior and the interior. The sections are as a rule produced as hollow sections, which have to be rather thin-walled, to enable an acceptable weight of the window casements and window frames. The fact that the section walls are so thin causes problems in the fastening of the fittings with the consequence that complex positive fastening solutions have to be applied when fastening the fittings, with the result that the final product becomes more expensive. It is advantageous that the windows and doors produced in such a way are weatherproof even without any particular protective measures.

The production of window casements and window frames from extruded plastic, optionally extruded PVC, is inexpensive in the original manufacture as well as during its use, since damage caused by weather is hardly to be expected. In order to reduce both the use of the material and the weight, the plastics sections are produced as relatively thin-walled hollow sections with the consequence that usually reinforcing inserts made of metal have to be inserted afterwards in the plastics sections in order to give the section the required flexural strength and the window casements and window frames the necessary torsional strength. The attaching of fittings is limited to thick-walled and multiple-walled areas as well as to areas containing metallic reinforcements. In so far as fittings are mounted on areas with metallic reinforcements, there occurs a difficulty in placing attaching screws.

A process, for extruding rods is known from the CH-A-642 901. In the process PVC waste is reused for a new production process. The moist PVC ground material is supplied to the extruder. In the PVC, ground material up to 25% by wgt of foreign substances, e.g. other plastic material, metal filings, rubber and conventional filling substances, can be contained. Substances serving the purpose of reinforcement, for example glass fibers, can be added, which may contribute to an improvement of the products of the process.

From the DE-A-1 906 012, it is known, to arrange a multiple stage die cutting instrument immediately after an extruder, in a process for the continuous production of accurate sections from thermoplastic plastics. The multiple stage die cutting instruments are passed through by the extruded section immediately after solidification and in so doing they are subsequently machined. In the process the cutting forces arising during the subsequent machining process are kept away from the forces arising during extrusion. For this purpose, the speed of withdrawing the section can be kept constant, whereas the cutting speed is adjusted independently from it. However it remains unchanged that the strand coming from the extruder passes through the multiple stage die cutting instruments undivided.

SUMMARY OF THE INVENTION

It is an object of the invention to provide a process for the manufacture of section material, preferably for the production of windows and doors, which circumvents considerable disadvantages of the known processes and combines considerable advantages of these known processes.

To accomplish this object the following measures are proposed in accordance with the invention:

d) the mixture adaptable to form strands is, under pressure, introduced in a preliminary section forming duct until the duct is completely charged, shaped to form a thick-walled preliminary section, at least partially hardened by cooling, and afterwards removed as a longitudinal part from the preliminary section forming duct with a length corresponding to the length of the preliminary section forming duct;

e) the preliminary section is left to a shrinkage process for a rest time of, for example, about 5 to about 10 hours, the rest time being enough to obtain a considerable amount of the overall shrinkage to be expected;

f) after this rest time the preliminary section is shaped by means of machining on at least parts of its circumference to form an intermediate section; and g) the intermediate section is coated on at least a part of its section circumference with a surface finishing layer.

The rest time can for example amount to approximately 5 to 10 hours.

The processing of thermoplastic plastics waste according to feature a) is actually known from the production of subordinated products. The processing of thermoplastic plastics waste to form section material for the manufacture of windows and doors has hitherto not been considered, since with the knowledge of the present manufacture of sections for doors and windows made of plastics, insufficient properties of strength and in particular insufficient surface quality had to be expected when using plastics waste.

In accordance with the invention and corresponding to feature d), the preliminary section is produced as a thick-walled section and optionally as a solid section and according to feature b) a second blending component is supplied to the plastics waste, such blending component containing a considerable amount of additives reducing the weight and/or increasing the strength. This makes it possible that, despite the low quality of the plastic material used, sufficient strength is obtained with an acceptable weight and at the same time a section is provided allowing fittings to be attached at any place by means of conventional fixing means, possibly wood screws.

The idea, which, at first glance, might seem strange and which is expressed in features d) and f), to subject sections for the production of windows and doors to a multiple profiling process, i.e. one profiling process by means of extrusion forming and a second profiling process by means of machining, makes it possible, by providing a rest time between the two profiling processes, to allow a considerable amount of the expected shrinkage to proceed in an interval before the final profiling process by means of machining takes place, so that after the machining of the sections the residual shrinkage will remain without considerable effect on the interaction of window casements and window frames and on the interaction of window frame and masonry. This is a very important aspect of the inventive process, in particular when taking into account the following considerations:

If painstakingly sorted new plastics material is used, its properties of shrinkage could be taken into consideration in the section forming process, i.e. when setting up the extrusion dies or any other parts responsible for the shape, so that window casements and window frames fit together in the desired form after the shrinkage has occurred. Thus either machining after treatment is not necessary at all or the machining after treatment is carried out immediately after the hardening of the preliminary section. In the processing of plastics waste according to feature a), a considerable dispersion is to be expected with regard to the shrinkage or contraction properties, so that it is practically not possible to include a definite shrinkage to be expected in one's calculation so that, after the shrinkage has occurred at both the section parts of the window casement and at the section parts of the window frame, these two frames fit together in the desired form. The mode of operation in accordance with the invention acts as a remedy in so far as it interposes a rest time between the strand-forming profiling section and the machining profiling process according to feature e). For it was realized that even when additives reducing the weight and/or increasing the strength, even in the case of highly dispersing properties of shrinkage, due to the different composition of waste plastics composed of material from various resources, a considerable amount of the overall shrinkage to be expected occurs within a relatively short period of time, of for example about 5 to about 10 hours, after the extrusion forming. Thus, the shrinkage which occurs after this rest time and after the subsequent machining process can either be calculated irrelevantly or largely independent of the plastics waste used, so that the desired interaction of window casement and window frame remains at the finished window and/or the finished door over a long period of time and that no disturbing shrinkage occurs at the point of separation between the window frame and the wall opening.

After the machining process, the thus produced intermediate section is coated according to feature g) on at least a part of its section circumference with a surface finishing layer, so that first of all the feared insufficient mechanical, and in particular the optical surface properties, are eliminated. Thus a section material is finally obtained that is at least equivalent to sections of light metal, sections of new plastics and surface-treated wood section with respect to its optical surface properties.

The use of thermoplastic plastics waste according to feature a) on the one hand leads to a price reduction in the manufacture of windows and doors, since this kind of plastics waste is inexpensively available on a large scale from many different resources, for example in the form of industrial plastics waste, but in particular in the form of local and domestic plastics waste which are obtained after a rough classification, e.g. the DSD system. On the other hand, in using thermoplastic plastics waste the process in accordance with the invention even solves the problem of disposal of plastics waste accumulated on a large scale.

When inexpensive new plastics are available, for example from a production surplus of plastics, these could also be used for carrying out the process in accordance with the invention. This simplifies various operations within the scope of the complete process. The same applies when uniform, non-contaminated plastics waste, e.g. cutting waste from the processing of plastics to form other products, is available.

By adding additives reducing the weight and/or increasing the strength in different quantities, the mechanical properties can be adjusted on a large scale according to one's wishes, in particular viewed from the standpoints of volume unit weight, compact cavity-free section material, flexural strength of the section material and tear-out strength of the fixing elements for the fixation of fittings.

In addition, the additives can be varied depending on the location, and depending on what kind of additives are available at the respective production site in sufficient quantity and for an acceptable price.

Preferably, polyolefine-based, optionally PE-based or/and PP-based plastics waste is mainly used as plastics waste. Alternatively, ABS-based plastics waste or mixtures derived from it can be used.

This plastics waste is not only characterized by favourble processing properties within the framework of the process in accordance with the invention, but, additionally, it is advantageous with respect to the disposal of windows and doors, when they have to be disposed of after the end of their usual service life or due to any other unforseen events. These sections and/or the final products produced from them can either be reprocessed to form raw material for the production of windows again or can be used for simpler applications. They can also be supplied to waste incineration without causing problems in the incineration plants.

The share of weight of the second blending component, with reference to the total weight of the preliminary section, can amount to between 1 and 60% by wgt.

Plastics waste suitable for the invention is in particular available in the form of film waste, e.g. as waste from packaging films, cover films, roof films or cup material (yoghurt cups). This plastics waste can basically be used uncleaned and depending on the construction of the plant even without size reduction; they can be transported to the respective production site in the form of bales, so that the logistic problem as compared to the transport to the plant of, for example, wood poles or wood bales is reduced considerably. The plastics waste can basically be used unpurified; adherent dirt, such as residual matter from packaging products in the case of residue from packaging material, is usually not disturbing and need not be washed out. It is, however, conceivable that again depending on the respective resources the plastics waste is mechanically or/and magnetically liberated from foreign particles disturbing the section formation.

In particular, it has to be pointed out that the plastics waste used in accordance with the invention as it accumulates in industry, household or towns is reduced, if necessary, and can be mixed as a first blending component with the second blending component. This means that the process in accordance with the invention does not necessarily use a type of recycling of plastics waste, in which the plastic waste is intermediately thermally plasticised after a drying and a cleaning process, shaped to form a strand, cooled down again and reduced in size. This mode of operation is circumvented in the process in accordance with the invention, which considerably improves the energy balance of the process in accordance with the invention even when a dry cleaning process is carried out mechanically or magnetically, and even when the plastics waste is reduced in size.

It is advisable that the plastics waste is dried to a residual moisture of less than 3% by wgt, preferably less than 1% by wgt, before they are mixed with the second blending component. Drying in particular means removal of moisture which is necessarily inherent in the plastics waste due to its present use and its storage, and as a rule not drying from wash water, which is preferably not used to avoid any further environmental problems. The "natural" dirt of the plastics waste is thus included in the mixing process and, astonishingly enough, does not disturb with respect to the final section. By melting of the plastics waste a kind of matrix is formed around the additives and the dirt particles during the formation of the preliminary section, so that basically no free dirt particles are present on the surface and optical or odor problems are avoided, but at the least eliminated when the surface finishing according to feature g) is applied.

The processing of plastics waste can be simplified when the plastics waste is reduced to a size of less than 20 mm, preferably to a size of less than 16 mm, of maximum axial length, before it is mixed with the second blending component. The term maximum axial length means: A plastics waste particle is allocated to cartesian coordinates with three axes, and the size of the particle is measured in all three axial directions of the coordinates. It has to be paid attention to the fact that no extension in any of the three measuring directions exceeds 16 mm. When dealing with film waste this means that a square can be circumscribed whose lateral length does not exceed 16 mm, or a circle can be circumscribed whose diameter does not exceed 16 mm.

If the plastics waste is present as stochasticly formed parts, as is provided by the preferred mode of implementation of the process in accordance with the invention, it is advisable to supply these parts under compacting pressure to the place of mixing together with the second blending component in order to at least attain an approximation of a constant blending ratio between the plastics waste and the additives. It is conceivable to take samples after the compaction, if desired after the extrusion, for every charge of plastics waste, on the one hand, and for the additives, on the other hand, and then adjust the supply of components to attain the desired blending ratio.

Depending on what kind of properties of the final product are important, the most different additives are possible for the second blending component. Mineralised additives can be used which, in any case, reduce the necessary use of plastics. Fibrous additives are preferably used because the properties of strength of the resulting section can be favorably attained, in particular by use of these additives.

According to a preferred embodiment of the process in accordance with the invention, the second blending component is at least partly formed from renewable raw material, if desired in its processed form. This makes the process in accordance with the invention economic as well as precious, since agricultural production surpluses can be processed. In addition, there is possibly the logistic advantage that the renewables for the second blending component can be obtained in the surroundings of the location of section formation. Especially suitable is agricultural harvest in its ground or fibrous form, for example grass, flax or any other kind of straw, which has proven to be particularly suitable. China grass fiber (miskanthus) has proven to be suitable as a second blending component which is preferably harvested in the third year after it had been sown. The ground or fibrous form of this kind of China grass fiber is characterized by particular tensile strength and surface roughness of the fibers so that when combined with the plastic material melted and hardened again it exhibits good reinforcement properties.

The second blending component is preferably dried to a water content of a maximum of 3% by wgt, preferably to 1% by wgt, before it is mixed and, if necessary, after it is reduced in size. We do not want to exclude that the drying process also takes place after the mixing; but since these two blending components are supplied to the place of mixing in their compact form for other reasons, mentioned before, and since the blend remains compact and is further compacted, it is advisable to dry the individual blending components before they are mixed.

The second blending component can also be adjusted to a determined spectrum of particle sizes, in order to have roughly standardized properties independent of the respective resource. In addition it is proposed to reduce the second blending component to a particle size of a maximum of 5 mm, preferably 3 mm maximum axial length.

Even the second blending component is preferably supplied under compacting pressure to the blend together with the first blending component, again with the purpose to achieve a weight relation between the individual blending components as constant as possible, and in addition with the purpose to keep the work of compaction low, after the mixing process, taking place, e.g. in a screw-type mixer charging the extrusion die.

The compacting pressure for the first or/and the second blending component can be retained, e.g. by storing the first or/and the second blending components in a storage silo, preferably tower silo, in the immediate vicinity of the place of combination, so that the static pressure of the storage height in the respective storage silo, if necessary, supported by mechanical compaction means, serves the purpose of compaction of the respective blending component at the place of combination. In the immediate vicinity of the place of combination of the blending components, if these were previously compacted by a great storage height or/and by additional measures of compaction, stirring or loosening devices can be provided so that the compacting pressure does not impair the output of the product.

If desired, the two blending components can be supplied to a screw-type extruder by means of an additional preliminary mixing stage, the screw-type extruder serving the further mixing and compaction of the two blending components and a first theromplasticising process of the first blending component.

Alternatively it is also possible that the blending components, before they are supplied to a screw-type extruder for the purpose of final mixing and thermoplasticising of the first blending component, i.e. for obtaining mixture adaptable to form strands (i.e. strand-forming mixture), that the blending components are subjected to a treatment of mixing, fulling or kneading, during which the thermoplastic blending component is at least partly thermally plasticised, and to pelletize the resulting mixture. In this case the pellets are supplied to the screw-type extruder. Then the pellets can be introduced in the screw-type extruder with part of their temperature adopted during the pelletizing process. To this end, the pelletizing temperature, for example in the case of processing polyolefine it is about 105° C. to about 130° C., preferably 112° C., can be cooled to 80° C. and the then cooled pellets are supplied to the screw-type extruder with a temperature of 80° C. When, in so doing, the temperature is reduced to the intended pellet temperature for entering the screw-type extruder in a much shorter period of time than corresponds to the transport time from pelletizing to entering the screw-type extruder, it is also conceivable to intermediately store the pellets, while at the same time retaining the temperature, at one point of the transport path from pelletizing to the screw-type extruder.

The intense mixing and pelletizing can for example take place in an annular die with milling or grinding rolls, which thoroughly mix the mixture of the blending components introduced in the interior of the die, they knead the mixture and finally they drive it out through the holes of the annular die. The thermoplasticised mixture strands discharging from the holes of the annular die can then be cut periodically with a shear blade, the shear blade being held attached to the outside of the rotating annular die, so that, whenever it passes a certain opening of the die, the strand which in the meantime passed through the opening of the die is cut off, thus producing pellets in the form of small cylindrical plugs in a predetermined size. The pellets thus formed have a diameter of, e.g. 3 mm and a length of, e.g. 5 mm. In these pellets, the fibrous additives of the second blending component are already well distributed in the molten constituents of the first blending component. The volume unit weight of these pellets is already relatively high. The necessary work of compaction is thus reduced in the next extruder screw in which the strand forming, thermally plasticised mixture for charging the preliminary section forming ducts is obtained. The drawback which could be present in the two thermoplastisicing processes is compensated by the fact that the work of compaction in the extruder screw can be reduced with the consequence that the extruder screw can be produced smaller and more inexpensively.

With respect to the reduction and cleaning stages it has to be added: Usually cleaning will only take place when a highly contaminated starting material is processed as a first blending material. In this process—as already mentioned before, if possible without wash water—the cleaning process will be chosen to be particularly adapted to remove metal particle and other hard particles, which could cause major disturbances in further processing. In accordance with this, preferably mechanical or/and magnetic cleaning means will be used. Preferably this kind of cleaning process is used, after the first blending component has been reduced to the above mentioned values of <80 mm, preferably <20 mm maximum axial length, because the hard particles to be separated can more easily be separated from the plastics particles. if a drying treatment is intended, for example with the above mentioned values of less than 3% by wgt water and preferably less than 1% by wgt water, the following is also possible: after the first blending component has been reduced in size it is subjected to a first cleaning treatment, then the drying treatment is carried out and after the drying treatment a renewed cleaning treatment is carried out, and then the particles of the first blending component can be supplied to the mixture with the particles of the second blending component, either in the pelletizing die itself or in an additional mixing mill connected in series before the pelletizing die. Under certain circumstances it is of advantage to use the thermal energy, introduced in the drying process of the first or/and second blending component, to support the pelletizing process.

Within the above mentioned rough area for the portion of the second blending component in the final product of 1–60% by wgt, preferably the following blending ratio is adjusted: weight ratio between the first and the second blending components corresponds to a ratio of 6 parts by weight plastics waste to one part by weight additives up to 4 parts by weight plastics waste to 1 part by weight additives, preferably about 5 parts by weight plastics waste to 1 part by weight additives.

The strand-forming mixture is preferably produced in a screw-type extruder, and preferably with the introduction of pellets into the screw-type extruder. From the screw-type extruder, the thermoplasticised mixture then reaches the preliminary section forming duct.

A SINGLE-screw-type extruder is preferably used as the screw-type extruder, in any case, when the screw-type extruder is fed with pellets. A SINGLE-screw-type extruder is preferably designed with a THREE-stage screw provided with a draw-in zone, a compression zone, and a discharge zone. The SINGLE-screw-type extruder can be preferably provided with one single spiral walk and the following dimensions:

constant pitch of 0.8 D
L/D ratio 15:1
draw-in zone 3 D
compression zone 7 D
discharge zone 5 D, D being the internal diameter of the screw cylinder and L being the active length of the screw.

A retention and mix zone can be connected to the screw-type extruder in which the strand-forming mixture is largely homogenized before it enters the preliminary section forming duct.

In the draw-in zone of the screw-type extruder, measures can be taken to avoid a turning of the introduced mixture with the rotating screw.

The flow resistance of the retention zone can be variable, to be able to adjust different degrees of homogenizing, on the one hand, and different flow resistances, on the other. It is advisable to adjust the flow resistance in the retention zone when the strand-forming mixture is supplied to the preliminary section forming duct from the discharge zone of the extruder screw, in order to attain a defined flow resistance.

For the charging phase of the preliminary section forming duct, it is advisable to keep the duct closed at its end remote from the charging end until it is completely filled in order to achieve a defined filling quantity. In the preliminary section forming duct, the section shape of the preliminary section is attained.

The release of the preliminary section from the preliminary section forming duct can happen in a way that the at least partially hardened preliminary section is removed by pushing by means of a pushing force acting from the charging end of the preliminary section forming duct or/and by pulling out of the preliminary section by means of a pulling force applied downstream at the end remote from the charging end. In this process, it is particularly advantageous when the at least partially hardened preliminary section is removed partly by recharging of the preliminary section forming duct at its charging end with strand-forming mixture and partly by pulling out the preliminary section that has already been partially discharged. For example, the at least partially hardened preliminary section can be pulled out by means of pull-out rollers.

The individual steps of the process of charging and releasing can take place in such a way that after the trailing end of an at least partially hardened preliminary section passes an exit-near boundary site of the preliminary section forming duct, the pulling out of the preliminary section is initiated with a speed exceeding the advance of the recharged material of the preliminary section forming duct, thus producing a space between the trailing end of the discharging, at least partially hardened preliminary section and the leading end of the recharged material. In the area of the space, the end remote from the charging end of the preliminary section forming duct is closed and the preliminary section forming duct then being filled up to a predetermined filling pressure, thereupon cutting off the preliminary section forming duct at its charging end from the inflow of further strand-forming mixture, and the new charge of strand-forming mixture contained in the preliminary section forming duct being exposed to an at least partial hardening.

In order to favour the formation of the thermoplasticised, strand-forming mixture in the extruder screw—possibly in the retention zone—by maintaining appropriate temperatures, on the one hand, and to carry out the temperature reduction necessary for the hardening in the following preliminary section forming duct unimpaired, it is advisable that the strand-forming mixture coming from the screw-type extruder is introduced through a thermal insulating portion into the preliminary section forming duct.

Especially when another charge of strand-forming mixture is used to push out a preliminary section completely or partially hardened, the charge forming the following preliminary section, it is desirable that in the area of its charging end the preliminary section forming duct is at least at the beginning of introducing a new charge of strand-forming mixture cooled such that the leading end of the new charge is rapidly through hardened. The result is a clear separation between the succeeding preliminary sections. In addition, a rapid through hardening of the leading end of the new charge is desirable such that, when starting the machine, a definite construction of the respective first preliminary section is achieved such that, in the center of the developing preliminary section, which is cooled less, no soft zone will form in which the strand-forming mixture can escape in an uncontrolled manner towards the discharging end. Therefore, it is advisable that in the area of its charging end the preliminary section forming duct is cooled to a greater extent than in the downstream part of its length.

The withdrawal motion is preferably initiated as soon as the leading end of the preliminary section partly pushed out exceeds a predetermined position, this moment being preferably determined by means of a photo-electric cell.

As soon as the withdrawal motion is initiated, the end remote from the charging end of the preliminary section forming duct can be closed with a preset delay after the onset of the withdrawal motion of the respective preliminary section.

The preliminary section forming duct can be cutoff from the inflow of the strand forming mixture in accordance with the build-up of pressure within the preliminary section forming duct, such pressure build-up being preferably measured at the charging end of the preliminary section forming duct.

The necessity of cooling in the preliminary section forming duct, to be able to constantly operate the screw-type extruder or any other source of strand-forming mixture, makes it seem expedient that with periodic repetition a plurality of preliminary section forming ducts are one after another connected to a point of influx of mixture adaptable to form strands.

Basically it is possible that the plurality of preliminary section forming ducts arranged on a circulating support are subsequently aligned with the point of influx.

With the respect to the avoidance of sealing problems, another embodiment is preferably used, i.e. that from the point of influx the strand-forming mixture is introduced into a distribution mains system connected to a plurality of preliminary section forming ducts via a corresponding plurality of connecting valves, and that successively, preferably according to a program repeated periodically, at least and preferably one connecting valve is opened. The advantage of this process of implementation is that conventional valves, exhibiting no sealing problems, can be used as connecting valves.

According to a preferred embodiment of the process in accordance with the invention, from the point of influx the strand-forming mixture is introduced into a distributor main, a plurality of connecting valves is distributed in the longitudinal direction of the distributor main between its inflowing end and the remote end from the inflowing end, at the beginning of a charging cycle of the preliminary section forming ducts connected to the connecting valves first of all the distributer main is cleaned at its end remote from the inflowing end by opening a cleaning valve and then the connecting valves are opened successively from the remote end of the inflowing end up to the inflowing end, this process being performed successively for the various distributor mains in the case that one or more corresponding distributor mains connected to the point of influx are present. The cleaning process provided for in this procedure ensures that any time the recharging of a preliminary section forming duct starts anew, a strand-forming mixture, sufficiently thermally plasticised, is prepared at is charging end.

It is advisable that the preliminary sections are produced in the respective preliminary section forming duct at a length of approximately 0.5–6 m, preferably approximately 4.5 m. In detail, the length of the preliminary section forming ducts depends on the necessary cross-section and the efficiency of the strand-forming-mixture source available for charging the respective preliminary section forming duct, i.e. it particularly depends on the efficiency of the screw-type extruder.

The preliminary sections can be produced with full sections. With respect to forming, i.e. in the manufacture of preliminary section forming ducts, the manufacture of preliminary sections with full sections is of advantage. The addition of variable portions of weight of the second blending component enables the adjustment of the weight of the preliminary section, desired for the respective use, e.g. in the manufacture of windows and doors, per unit of length according to one's wishes, even when the preliminary section is produced as a solid section.

Further, the fact that the preliminary section is produced as a solid section facilitates the attaching of fittings.

In order to provide high flexural and buckling strength of the preliminary section, and thus of the final section material, that the preliminary section forming duct is filled at such flow conditions of the strand-forming mixture such that, in the presence of elongated fibrous particles in said second blending component, the particles predominantly arrange themselves in the respective longitudinal direction of the section. The orientation of the fibrous particles can be favoured in the preliminary section forming duct as well as in the retention zone connected in series. For parallelising the fibers in the preliminary section forming duct, it is advantageous that the duct is progressively filled from the enter point to the exit point. For this process, an increased cooling in the entrance of the preliminary section forming duct is desired.

The further sequence of the production after the release of the preliminary sections can happen in such a way that in the course of leaving the respective preliminary section forming duct the preliminary sections are placed on a place of deposit for preliminary sections, and after they are completely discharged from the respective preliminary section forming duct, they are transported to a machining facility and in so doing left to a shrinkage process. One can make use of the transport distance of the preliminary sections to the machining facility in order to run the shrinkage process. It is possible that at least a part of the transport distance is covered on a distance transverse to the longitudinal axis of the respective preliminary section. Thus the distance from the release to the machining process can be shortened and the transport time can nevertheless be attained when the transport speed transverse to the longitudinal axis of the respective preliminary section is kept correspondingly low.

It was already pointed out that it is desirable to continuously operate the screw-type extruder. This conflicts with the necessity to periodically interrupt the flow of strand-forming mixture when the supply of mixture to one preliminary section forming duct is switched to the preliminary section forming duct to be filled next. Therefore it is proposed that a buffer volume is provided in the area of the connection of the screw-type extruder to the preliminary section forming duct or to a plurality of preliminary section forming ducts, the buffer volume accommodating the strand-forming mixture whenever the inflow of the mixture to the preliminary section forming duct or the preliminary section forming ducts is reduced or interrupted.

It was already pointed out that the pellets can be supplied to a screw-type extruder in a preheated state of for example 60° C.

Thus the energy supply in the screw-type extruder can be reduced.

Furthermore, it is possible that the pellets are cooled from their temperature reached during the pelletizing process down to a extruder charging temperature and are supplied to the extruder with this extruder charging temperature. From the point of view of the energy management, this measure is favourable because one part of the energy necessary for the melting of the plastic material need be supplied only once.

Tiny components such as slip additives, colored pigments and stabilizers can be added to the mixture adapted to form strands. Basically it is possible that the tiny components are added to the first or second blending component or—as far as pellets are formed—added to the pellets. Usually it is advantageous when the tiny components are added to the pellets. A considerable addition is the colored pigment. Preferably a black colored pigment, optionally soot, is added. Soot is characterized by low preparation costs and a high covering power. The high covering power provides that section surfaces that are possibly not machined or section surfaces that are machined and not covered by the coating layer exhibit a favourable optical appearance with the impression of a high finish-quality. Black proves to be particularly favourable due to its high optical absorption.

The preliminary section can be machined in a machining facility with a plurality of rotating machining heads distributed about the circumference of the preliminary section, the machining heads being arranged in series in the passing direction of the preliminary section. In general, attention should be paid to the fact that the cutting capacity supplied to the preliminary section during the machining process is limited to such an extent that basically the content of thermoplastics in the respective machined preliminary section is not thermally plasticised. One possibility to influence the temperature at the place of machining consists in using machining heads with a large diameter, so that the heat exchange between the machining heads and the ambient air makes a cooling of the tool and thus also of the machining site at the work piece possible after passing through the respective site of machining. It is up to the operator of the machine to adjust the optimum diameter of the machining heads in accordance with the temperature measurements.

According to a first alternative, the surface finish achieved through the coating layer can take place in such a way that the intermediate section obtained from the machining process is supplied to a coating duct via a centering duct that is adapted to the section, the coating duct having a surplus corresponding to the coating thickness as compared to the preliminary section and having at least one feeding duct for the coating material and, if desired, distributor means. For leveling the coating layer, it can be of advantage if the intermediate section coated with said coating material is subjected to a partial vacuum leveling the surface in a secondary profiling duct after it has been partially hardened, optionally after passing through a cooling bath. When this kind of surface finishing is used, the coating material can be applied with a thickness of approximately 0.1–approximately 2.0 mm, preferably 0.7 mm to 0.8 mm. Coating material having a high affinity to the respective blending constituents will be used with advantage. Therefore it will be particularly taken into consideration to apply a thermoplastic coating material, for example polyolefine-, ABS- or PVC-based. This is also advantageous with respect to the final use of the sections. The coating material can be mixed with a content of colored pigment, optionally white colored pigment, so that the surface of the intermediate section is basically invisible.

According to another preferred alternative of surface finishing, it is provided that the intermediate section is covered with a coating profile on at least a part of its section circumference. Optionally a metal section can be used as a coating profile, such as an aluminum section that can easily be profiled by bending. Preferably the coating profile consists of a carrier layer, e.g. aluminum, and a decorative layer, e.g. a coat of paint or lacquer applied to the aluminum layer.

In order to avoid damage of the coating profile until the window is finally fit in, it is proposed that the coating profile be provided with a protective film on its visible side. The protective film can be fixed with an adhesive layer with such an adhesive force that it can be easily pulled off after it has fulfilled its function of protection.

There is the possibility that the coating profile is formed from a preliminary material strip at the intermediate section. Furthermore, there is the possibility that the coating profile, immediately before it is applied to the intermediate section, is at least partly preformed and applied to the intermediate section in its preformed state. In both cases the great advantage is achieved by the fact that the coating profile can be brought to the place of application in the form of a flat strip in a coil, so that transport capacity is saved and the danger of premature deformation is circumvented. The aluminum section can be formed by a plurality of profile rollers arranged one after another in the running direction. The profile rollers either interact with the coated preliminary section or the intermediate section, respectively, in order to form a section, or they interact with the appropriate mating rolls, when the sections are first of all formed independently from the combination with the preliminary section or the intermediate section.

The coating profile can be attached to the intermediate section or the preliminary section by glueing, owing to the fact that the glue is used as a preformed glue layer or owing to the fact that the glue is used as a coat of the coating profile. The glue can be used as a separate strip material and can be applied either on the preliminary material of the coating profile or on the intermediate section immediately before the coating profile is combined with the intermediate section.

It is also possible that the coating profile is at least partly positively attached to the intermediate section; in this case the coating profile can be provided on at least one edge with a positive flange.

When talking about coating profiles it has to be pointed out that the section wall of the coating profile can be much thinner than that of self-supporting aluminum sections and/or plastics sections. When aluminum sections are used as coated layers, the wall thickness of the aluminum section can for example be 0.1–1.0 mm, preferably 0.3–0.6 mm. The thickness of a possible decorative layer of the coating profile is dimensioned in such a way that it will be resistant to the shocks and scratches occurring during the operation.

Basically a coating profile can cover the overall section circumference or a considerable part of the section circumference of the preliminary section and/or the intermediate section. However, it could be advantageous, in particular in the case of window casements or window frames, if the coating profile is applied in the form of two partial shells, which are spaced at the section sides of the intermediate section that correspond to the inner circumference and the outer circumference of the respective frame. The advantage can not only be seen in a simpler application but particularly in that a cold bridge is avoided, in the case of metallic coating profiles, even when the cross-section is small.

The process in accordance with the invention also offers the possibility that the coating profile is used on at least one of its profile edges for the formation of holding edges, e.g. for sealing or joining material.

If a final section obtained by applying a coated layer is further processed to form a window or a door, a portion of the section material of the final section can be cut for mitering at a respective corner-forming site and combined with an abutting portion of the section material, which is mitered, by means of at least one screw transversing the miter plane; if desired, the screw intersperses the coated layer. In this process a hardened sealing material can be placed in the mitered surfaces of abutting portions of the section material before they are screwed together. If the section material manufactured in accordance with the invention is to be further processed to form windows or doors, this can be done in such a way that the section material completed to form a final section is manufactured with a fixation groove for a window pane or any other filling plate, these being fixed in the fixation grooves in the course of connecting the portions of the section material with the respective frame. In this process fittings are attached to the respective frame by conventional wood screws, if desired, without preliminary boring. The wood screws can be introduced through the coated layer into the respective intermediate section.

Furthermore, in the manufacture of windows and doors, the section areas of the final section that are not covered by the coated layer can be left with the surface quality achieved after the preliminary section manufacture or the intermediate section manufacture.

The rest time, which shall lead to at least the partial shrinking of the preliminary section before it is machined further, can under certain circumstances be shortened in the case of rapidly shrinking plastics, and possibly shortened to such an extent that no further rest time is necessary after the cooling process, which leads to hardening.

There always consists the advantage that section material that can easily be processed, can be further processed in the wood joint technology. Depending on the kind of blending components there is the further advantage of processing plastics waste that is easily available or/and has to be disposed of and the advantage of renewable raw material, the use of which is an additional utilizition for agriculture.

If plastics waste is absent or new plastics material is cheaply available, for example in the form of granules, the process in accordance with the invention can even be carried out when using new plastics.

When using polyolefines, the inflow temperature of the strand-forming mixture to the preliminary section forming ducts can be adjusted to approximately 150° C.–195° C. The pressure of the matter of the strand-forming mixture in the final stage of charging a preliminary section forming duct can amount to approximately 100 to approxiamtely 220 bar, preferably approximately 170 bar. The pressure of the matter can also be used as a cutting-off pressure for closing the mould. Starting out from the supposition that the pressure of the matter is reduced in the retention zone, this means that upstream of the retention zone a pressure of matter of up to 300 bar can be built up, again under the precondition that the mixture basically contains polyolefines as plastics parts.

The pressure of the strand-forming mixture that is supplied to the next preform is used for the release of a preliminary section and can be adjusted to approximately 10–300 bar.

The quality of the finished products, e.g. windows or doors, can under certain circumstances be enhanced, in that the sections that are already machined and under circumstances already coated with coating profile can be subjected to another rest time until they are finally processed.

When plastics waste containing undesirable thermoplastic foreign substances is used, it can also be sorted out. For example it can be desirable, with respect to the final use of the sections, to split off PVC portions.

This invention relates further to an arrangement for the manufacture of a section material, optionally a preliminary section, within the framework of the process described above, comprising a screw-type extruder with a charging site for filling in the blending components of a thermoplastic mixture and with a discharging site for the discharge of a strand-forming thermoplasticised mixture.

The invention is characterized by a stationary distributor main with an influx site in connection with the discharge site of the screw-type extruder, a plurality of duct-charging connections at the stationary distributor main, these duct-charging connections each in connection with a preliminary section forming duct, connecting valves between the individual preliminary section forming ducts and the distributor main, section slide gates at the downstream ends of the preliminary section forming ducts, a withdrawal device located at the respective downstream ends of the preliminary section forming ducts as well as a program control means with a sensory mechanism for filling condition, pushing out, withdrawing and time lapse which after charging a section forming duct closes the respective connecting valve;

after a cooling period for cooling the mixture contained in the section forming duct, opens the proper section slide gate and the proper connecting valve;

after the section, already hardened, has been partly pushed out by the mixture continuously flowing in via the connecting valve, subjects the section partly pushed out to the influence of the withdrawal device and separates it from the leading end of the refilled mixture;

after the separation of the trailing end of the section and the leading end of the inflowing mixture, closes the slide gate within the thus formed separation gap and then refills the section forming duct completely until it reaches the necessary quantity for the formation of another section.

By charging the individual section forming ducts, the strict continuous passing process is no longer necessary. The sections necessarily occur in the form of individual section portions. These individual section portions can then be stored during a long rest time in a space-saving manner, in order to allow enough shrinkage to occur.

The preliminary section forming ducts can be arranged in a coolant bath. If a temperature program that can be varied with the respect to its location is maintained over the length of the preliminary section forming ducts, the coolant bath can be divided up in individual portions with different coolant temperatures.

The control can be designed in such a way that the withdrawal device becomes effective whenever the leading end of the preliminary section, subjected to pushing out, reaches a predetermined point downstream from the slide gate and in such a way that the slide gate is closed, when the trailing end of the preliminary section, subjected to pushing out, reaches a predetermined distance from the leading end of the refilled mixture. Furthermore, the control can be designed in such a way that the connecting valve of a preliminary section forming duct is closed, when a predetermined filling pressure is detected in the preliminary section forming duct.

Contiguous to the slide gates of the preliminary section forming ducts, there can be a place of deposit for depositing the preliminary sections pushed out; a conveyor can be contiguous to the deposit table, if necessary, with a transfer machine connected in between, the conveying direction of the conveyor being transversely to the axis of the section.

The discharge site of the screw-type extruder can be provided with a retention or homogenizing device, which, in turn, is contiguous to the distributor main.

Due to the reasons mentioned above, to keep the screw-type extruder small, it can be an advantage, if the screw-type extruder is developed for further processing pelletized mixture. The screw-type extruder can be provided with a charging shaft, basically radial, having a basically rectangular cross-section and preferably open to the top.

In order to calibrate the feed of the screw-type extruder per unit of time, it is advisable that the cylinder of the screw-type extruder is provided with inhibitors, at least in the area of a draw-in zone, to restrain a turning of the charge. The inhibitors can be formed by basically axially directed grooves at the inner circumference of the cylinder. The depth of the grooves can diminish in the axial direction of the cylinder towards the discharging end.

This invention relates further to section material, optionally for the production of section frames in the manufacture of windows and doors, consisting of a solid section containing filler material besides thermoplastic constituents and provided with at least one coating layer in the form of a sheet section on at least part of its section circumference. The sheet section is preferably formed from an aluminum section which is provided with a coat of paint or lacquer on its visible side.

The sheet section can be glued together with a solid section; it is also possible that said sheet section is kept in positive engagement with the solid section.

At least one edge of said sheet section can be formed as a holding edge, e.g. for sealing or joining material.

The sheet section can be formed by two section shells, the first shell—with reference to the design of the finished window—covering an inside part of the section surface and the second shell covering an outside part of the section surface. In the case of sections for window casements, the two shells are spaced in the section area of the pane mount and in the section area of the frame fold, and in the case of sections for window frames, they are spaced in the section area of the window frame fold and the circumferential area on the side of the wall opening. This prevents the formation of a cold bridge.

The circumferential surface of the solid section remains untreated or is only treated by machining in the areas (346*x*) not covered by the sheet section (308*x*, 310*x*).

By adding an appropriate content of color pigment the area not covered by the sheet section becomes an uniformly colored color picture, optionally black.

A window or door frame produced from the section material in accordance with the invention can be assembled in such a way that contiguous section legs are contiguous with being cut for mitering and are screwed or glued together in the mitred area.

For producing a frame combination consisting of one window casement and one door frame, it is, of course, possible to produce different preliminary sections for window casements and window frames. The preliminary section is perfectly adapted to the respective final shape of the section, so that the machining process requires only a minimum of cutting force. It is also possible that uniform solid sections are used for the manufacture of window casements and window frames, such solid sections differing only in their machining process or/and the coating with sheet sections. Advantage will be taken of this possibility in particular with respect to the investment costs of a section forming plant, if first of all only one such plant is to be used for sections of window casements and window frames.

The process in accordance with the invention for the manufacture of section material also allows the production of section material for other applications than the ones in the manufacture of doors and windows, for example for the manufacture of furniture, building of houses, packaging construction, pallets, and the like.

BRIEF DESCRIPTION OF THE DRAWINGS

Embodiments of the invention are explained in greater detail below in connection with the figures, in which:

FIG. 4 shows a general drawing depicting the relationship of the following FIGS. 4A and 4B;

FIG. 4A illustrates the upstream portion of the first stage of shaping, upstream with respect to the material flow;

FIG. 4B illustrates the downstream portion of the first stage of shaping, downstream with respect to the material flow;

FIG. 5 illustrates the transition from the first stage of shaping to the second stage of shaping;

FIG. 6 illustrates the coating stage;

FIG. 7 shows a general drawing depicting the relationship of the following FIGS. 7A–7C;

FIG. 7A illustrates the upstream portion of the plastic preparation, upstream with respect to the material flow;

FIG. 7B illustrates the middle portion of the plastic preparation, middle with respect to the material flow;

FIG. 15a illustrates a common preliminary section to obtain the sections according to FIG. 15;

FIG. 15b illustrates the sequence of the layers of a coating profile shell;

DETAILED DESCRIPTION OF THE INVENTION

Figure 1:
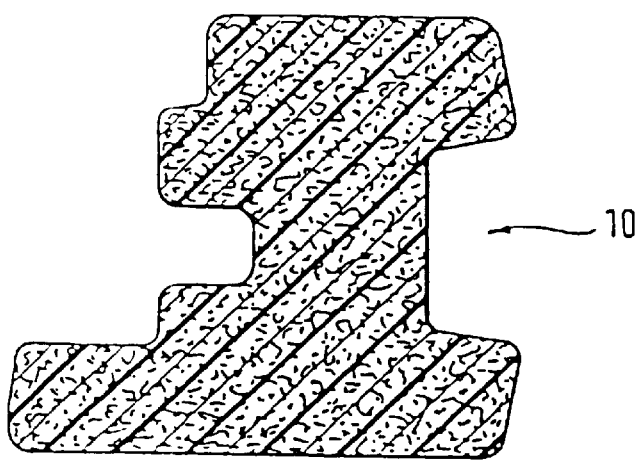
FIG. 1 illustrates the cross-section of preliminary section, produced according to a first stage of shaping of the inventive process.

In FIG. 1 the cross-section is illustrated of a preliminary section, which will be machined further in a process which will be described later on to form a final section for the manufacture of window casements or window frames. The preliminary section is designated 10. Its cross-section is larger than the actual final section used for the manufacture of windows. It is a solid section consisting of 5 parts by weight thermoplastic plastic material, e.g. polyethelene or polypropylene or ABS or a mixture therefrom, and 1 part by weight additives, i.e. China grass fiber. The additves are distributed evenly over the cross-section. The plastics portion forms a matrix enclosing individual fibers of the additives or small groups of individual fibers. The fibers are elongated and have a longitudinal extension of approximately 3 mm. Just in case that foreign substances were contained in the plastics portion, depending on its origin, these substances are also basically enclosed by the matrix.

With regard to the manufacture of preliminary section, 10, a reference is made to FIGS. 4A–4B. A storage silo 12 can be seen in FIG. 4A. The silo is charged by means of a pipe 14 via a conveyor ventilator with plastic adaptable to be processed. The recovery of the plastic adaptable to be processed will be described later with reference to FIGS. 7A–7C. With regard to the structure of the plastic adaptable to be processed, the only thing that has to be determined is that the plastic is present in the form of particles with irregular sizes which—when loosely pile up—exhibit a low packing density that varies from place to place. The storage silo 12 is developed as a tower silo, so that on the ground, due to the net weight of the plastics particles, a natural compaction occurs. This natural compaction can be supported by a star-type conveyor 16 rotating about the axis A, the inclination of the blade of said star-type conveyor causes an effect of compaction downwards. Furthermore, a tower silo 18 can be seen, charged from a prepartion station with additives adaptable to be processed, and in the example given, with a ground or defibrated harvest of China grass fiber, which was harvested for the first time three years after it was sown. In this case we are dealing with a perennial plant which can be cut several times.

The preparation will be explained in greater detail below in connection with FIG. 8. It is satisfactory to state that the prepared fiber material is present in the form of elongated fibers with a length of approximately 3 mm. When loosely stored these fiber materials also have a low packing density. In the tower silo 18 (FIG. 4A) the packing density is increased, which, again, can be supported by means of a star-type conveyor 20.

The tower silo 18 is charged with the fiber material by means of a conveyor, known as cable conveyor, i.e. an endless or pendular rope within a conveyor channel having a surface that takes up the fiber material.

The compaction of the plastics particles and the fiber material in these two tower silos 12, 18 is decisive so that the following devices for mixing and thermoplasticising the plastics material can be relieved of the compaction work and can thus be produced at a much cheaper price.

On their way from the two tower silos 12, 18 the two blending components, plastics particles and fiber material, are transported to a mixing mill in the mixing point 22, the transport to the mixing point 22 being carried out by screw conveyors or the like. Contiguous to the mixing point 22 is the conveyor screw 24, enclosed by a screw cylinder 26. The mixing process already initiated in the mixing point 22, and which can also be supported by moving mixing organs in the mixing point 22, is continued in the area of the conveyor screw 24, so that a homogeneous mixture of plastics and fiber material is present at the exit 32 of the conveyor screw 24 (on the right side in FIG. 4A). In FIG. 4A, the conveyor screw 24 is only depicted schematically. The conveyor screw 24 can be designed in such a way that its diameter, in any case its radial screw height, increases in the direction of conveyance, corresponding to an increasing compaction and a decrease in volume of the mixed material. In the course of the motion along the directional arrow 28 the plastics portion of the mixed material is heated and thermally plasticised. This heating can be controlled by means of heater bands or heating chambers 30. A homogeneous, viscous mixture, comparable with a chewing-gum like kneading mass with a temperature of approximately 180° C. is present at the exit 32 of the conveyor screw 24. By means of the conveyor screw 24, the mixture is forced through an extrusion die 34. At the exit of the extrusion die 34 a revolver cylinder 36 is located having a plurality of preliminary section forming ducts 38 which are parallel to the axis and distributed about the circumference. The cross-section of the preliminary section forming ducts at least approximately corresponds to the cross-section of the extrusion dies 34. At any point in time during the continuous course of the procedure only one preliminary section forming duct 38 is charged with the viscous mixture until it is completely filled. After the preliminary section forming ducts 38—during the charging process they are closed at the right end according to FIG. 4B—are completely charged, the revolver cylinder 36 is turned thus causing a switching operation towards that preliminary section forming duct 38 following in the circumferential direction. The revolver cylinder 36 is contained in a cooling water reservoir 40 so that the mixture contained in the preliminary section forming ducts 38 is cooled and thus hardened. After a certain preliminary section forming duct 38 has been filled it remains filled until all other preliminary section forming ducts 38 are filled and it is again positioned immediately in front of the position of connection to the extrusion die 34, i.e. practically after one full revolution of the revolver cylinder 36. This guarantees a considerable rest time of the mixture within the cooling water reservoir 40. This rest time suffices to allow a hardening of the mixture until the preliminary section formed can be handled. During the switching operation of the revolver cylinder 36 in the circumferential direction, the conveyance carried out by the conveyor screw 24 is continued in the direction of conveyance 28, while a schematically illustrated buffer space 42 is able to adopt the mixture accumulating during the period of switching. The mixture can be redirected towards the entrance or elastically pressed into the area of extrusion.

If a preliminary section forming duct 38 is largely to be cleared from the already hardened preliminary section 10 after an almost complete revolution of the revolver cylinder 36, the preliminary section forming duct 38 is aligned with a pusher 44 at the upstream end of the revolver cylinder 36. Then the pusher 44 can enter the respective preliminary section forming duct 38 in the direction of arrow 46 and push the resultant preliminary section 10 so far out from the right end of the preliminary section forming duct 38 that it can be captured by a caterpillar pull-off 48. The preliminary section can be seen in FIG. 4B; according to the designation in FIG. 1 it is designated 10. The preliminary section 10 is placed onto a conveyor table 50 by means of the caterpiller pull-off 48. The conveyor table 50 is equipped with a plurality of conveyor belts 52 whose direction of conveyance is indicated in FIG. 4B with arrow 54. This means that the direction of conveyance of the preliminary section now is orthogonal to the longitudinal direction of the preliminary section 10. The preliminary sections 10 can stay in the area of the conveyor table 50 for a first rest time of for example 5–10 hours. The conveyor belts 52 can run so slowly as is just necessary for a given preset rest time in order for the preliminary sections 10 to achieve the next station within the given rest time. Hence it is evident that in this way a relatively small outline of the respective plant suffices even in the case of very efficient plants.

As a variation of the term "extrusion", this type of manufacture of sections described above is called "intrusion" because the thermally plasticised mixture is pressed into the preliminary section forming duct 38. While passing through the extrusion die 34 and while advancing in the preliminary section forming duct 38, the fibers of the fiber material take on a mainly parallel position parallel to the longitudinal axis of the preliminary section strand. This is of considerable advantage with respect to the flexural strength of the hardened preliminary section strand.

In order to roughly achieve a constant composition of the mixture and thus of the preliminary section 10, the conveyor screws connecting the tower silos 12, 18 with the mixing point 22 are formed as metering screws. It is conceivable that the conveyance speed and thus the dose effect of the individual metering screws are corrected and adjusted to the desired values in accordance with the measured actual value of the composition by feed back from a sensory mechanism of the composition to the metering screws.

Figure 2:
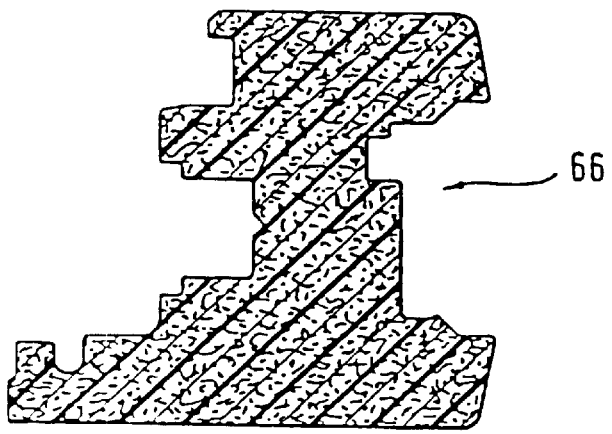
FIG. 2 illustrates the cross-section of an intermediate section, produced according to a second stage of shaping of the inventive process.

FIG. 5 is again an illustration of the conveyor table 50 with the conveyor belts 52 and a preliminary section 10 in the area of the conveyor table 50. As the preliminary section 10 moves through the conveyor belts 52 in the direction of arrow 54 it reaches a longitudinal conveyor 56 after the expiration of a preset first rest time of 5–10 hours. The longitudinal conveyor 56 drives the preliminary section 10 in the direction of arrow 58. The longitudinal conveyor 56 is composed of two portions 56a and 56b, with a machining station 60 with rotating machining heads 64a–64d connected in between. In this machining station 60, the intermediate section 66 according to FIG. 2 is obtained from the preliminary section 10 according to FIG. 1. The individual machining heads 64a–64d, which can be present in a much higher number as indicated in FIG. 5, are distributed throughout the distance between the two longitudinal conveyors 56a and 56b.

Through the intended rest time of approximately 5–10 hours on the conveyor table 50, a considerable part of the overall expected shrinkage of the preliminary sections has already occurred so that only a relativley low amount of residual shrinkage is to be expected. The residual shrinkage still to be expected has a calculable value but is indeed finite. When adjusting the machining heads 64a–64d this residual shrinkage is taken into consideration, so that at the discharge end of the machining station 60 a preliminary section 66 with an excess is present on the longitudinal conveyor belt 56b. The excess, however, is calculable as compared to the final dimension of the cross-section. After the intermediate sections 66 are coated, they are finally processed to form window casements or window frames. A residual shrinkage might occur provided that in special cases a rest time is required that is considerably longer. In the manufacture of windows and doors, however, the residual shrinkage is taken into consideration so that after this residual shrinkage has occurred—it may occur when the doors or windows are already finished or even fit in—the operativeness of the windows and/or doors is thus no longer put into question.

The preliminary section 66 according to FIG. 2, coming from the conveyor belt 56b and obtained from the machining process, can be supplied to a coating station according to FIG. 6. The coating station comprises first of all a positioning unit 68 in the form of a positioning die or a positioning roller system with the object to position the intermediate section 66 relative to an annular coating die 70, so that between the outer circumference of the intermediate section 66 and the lumen of the annular coating die 70 a coating gap 72 with an almost constant gap thickness develops over the total circumference of the intermediate section 66. A treatment device 74 is connected in series with the annular coating die 70. In the treatment device 74 the surface of the intermediate section 66 is treated to prompt adhesion for a coating film. The surface can be treated with for example chemicals or high-energy radiation releasing free radicals on the surface of the intermediate section 66 for chemically binding the coating film. A ring distributor duct 76 is provided in the annular coating die 70, such ring distributor duct 76 is supplied with film-forming forming coating material via a duct 78. The film-forming coating material is evenly distributed over the entire circumference of the intermediate section 66 by means of the ring distributor duct 76 and forms a film 80 covering the intermediate section 66 on all sides. The film-forming coating material can be formed from, for example, molten polyethylene or polypropylene to which white colored pigments are added in such a concentration that the surface is optically completely covered.

After the annular coating die 70, the coated intermediate section 66 is cooled by a cooling device 82 to such an extent that the film 80 solidifies largely but not completely. Together with the partly hardened film 80 the intermediate section 66 is then driven through secondary section treatment die 84, in which a partial vacuum is applied to the total surface of the film 80 or, at any rate, to areas that are optically visible. The partial vacuum is applied by means of microporous walls 86, at the back of which a vacuum is maintained by means of a vent duct 88. The partial vacuum applied to the film 80 by means of the micorporous walls 86, on the one hand, and the still extisting plasticity of the film 80, on the other hand, are adjusted in such a way with respect to each other that the film 80 is leveled when passing through the secondary section treatment die 84, while at the same time the film 80 is smoothed by means of the finish-machined contact surfaces of the microporous walls 86.

Figure 3:
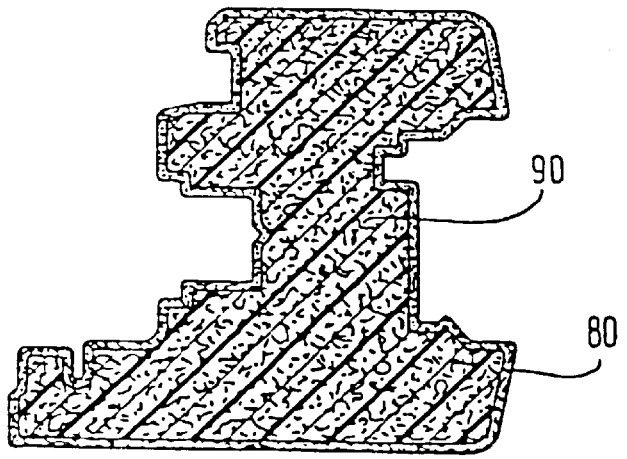
FIG. 3 illustrates the cross-section of the final section, produced according to a coating stage of the inventive process.
Figure 9:
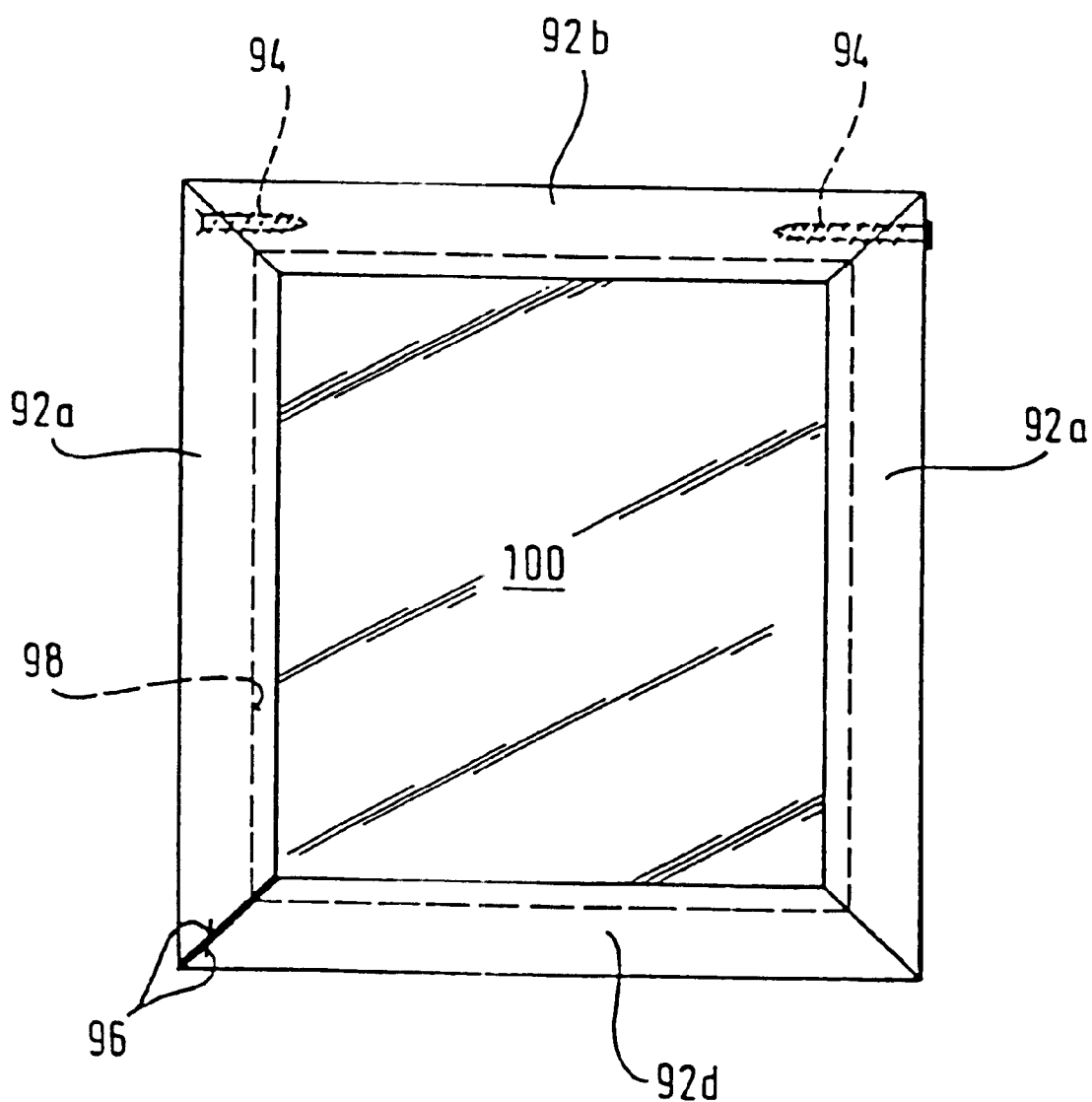
FIG. 9 illustrates a window casement of a window, produced from section bars, as they were obtained according to the FIGS. 1–6.

The final section 90 is present at the discharge end of the secondary section treatment die 84, shown in detail in FIG. 3, i.e. the section with the coating film 80 on its surface. This section for example can now be processed to form window casements, as they are represented in FIG. 9. There are individual section bars 92a–92d that are mitred on their ends and connected by wood screws 94, a hardening sealing material can be introduced into the mitered surfaces 96. An annular groove 98 can be seen in the individual bars, suited to receive a window pane 100, which in the course of assembling is inserted in the annular groove 98 and is thus fixed.

Figure 7C:
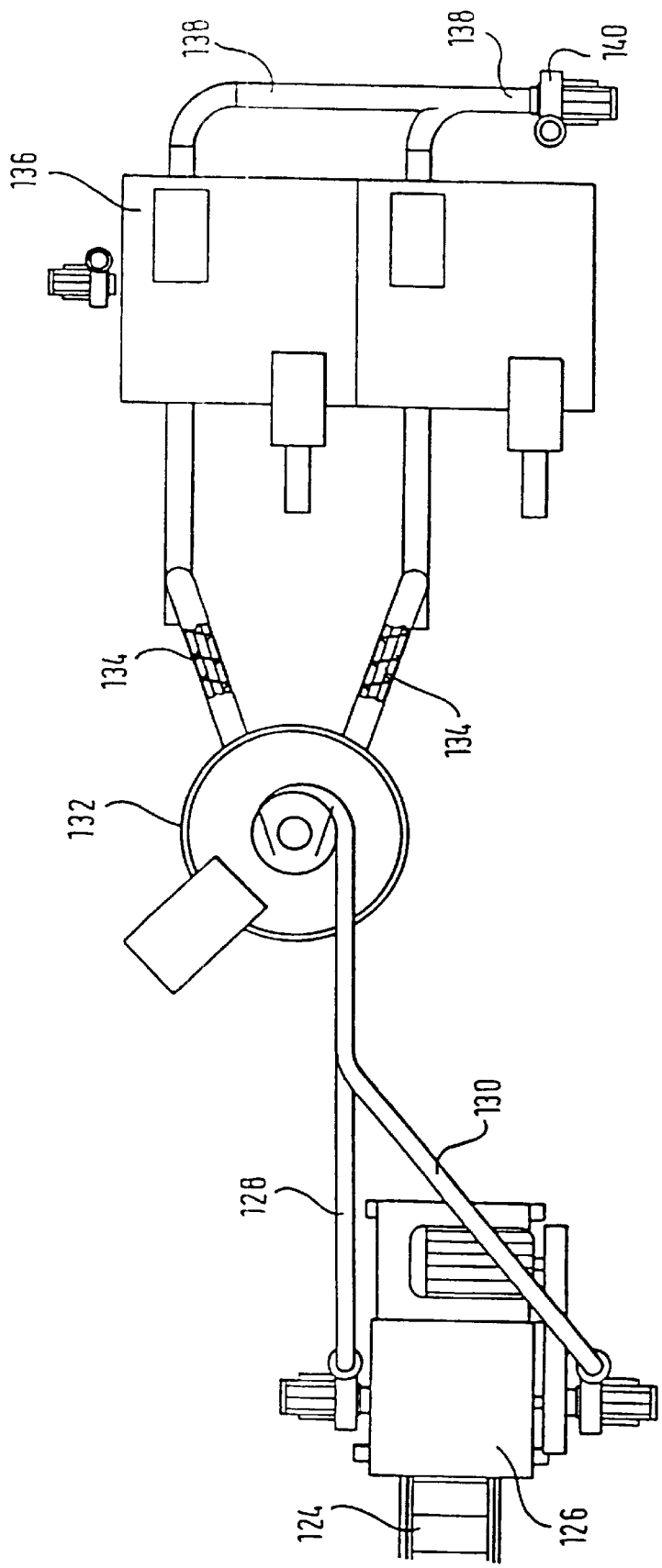
FIG. 7C illustrates the downstream portion of the plastic preparation, downstream with respect to the material flow.

FIGS. 7A–7C represent the preparation of the plastic material. It is assumed that plastics waste is processed that is obtained from sorting out domestic or local waste. It is transported in bales to the plant and introduced into the plant by means of a bale conveyor 102. At the end of the bale conveyor 102 there is a bale scarifier 104, in which the bales are thrown in through a funnel 106. The bales are torn open in the bale scarifier 104, loosened and transported to a screen-out drum 110 by means of another conveyor belt 108. Heavy coarse parts, e.g. locking tin caps of plastic bottles, are screened out in the screen-out drum 110. The plastic fragments and shreds, liberated from the heavy parts, are then transported by a contiguous conveyor belt 112 to a magnetized slide gate 114, in which ferromagnetized constituents are separated. Then another conveyor belt 116 transports the plastics parts to friction centrifuge 118. The centrifuge 118 is formed as a passing device with a passing direction according to arrow 120. We are dealing with a screening drum whose jacket is occupied with a conveyor screw at its inner circumference. The conveyor screw causes the conveyance to be carried out in the direction of arrow 120. The speed is so high so that the paper constituents mostly moistened show a tendency towards the radial outer side. These paper parts are then discharged through screen openings of the screening drum, such openings having a opening width of approximately 2 mm. The paper parts are collected in a collecting chamber 122 and carried away from there. From the friction centrifuge 118, the waste, now consisting of 90% plastic material, reaches another conveyor belt 124. Basically the plastic material still has its original size of the shreds and bottle parts combined in the bales, however, aluminum parts from bottle caps and the like can also be present. The conveyor belt 124 transports the material to a cutting mill 126 illustrated in FIG. 7C. The cutting mill consists of a stator casing and a rotor supported in the stator casing. Stator casing and rotor are equipped in a rake-like manner with cutting instruments at their inner and/or their outer circumference. The interaction of the cutting instruments reduces the plastics residues to a maximum of about 16 mm axial length. The plastics particles obtained from the reduction are then tangentially supplied to a cyclone 132 through conveyor pipes 128 and 130. In the cyclone 132 tiny constituents are discharged at the top together with hot air, whereas the coarse plastics parts descend to the bottom. A stirring machine can be installed in the cyclone 132 serving to avoid the formation of bridges within the cyclone 132. The tiny constituents discharged with the hot air can be collected in a filter. From the lower part of the cyclone 132 the plastics particles reach a drying plant 136 via conveyor screws 134. In the drying plant 136 the plastics particles are dried with approximately 70° C.–80° C. hot air by means of the fluidization process to a residual moisture of less than 1% by wgt. Pipes 138 with a pneumatic conveyor 140 lead from the drying plant 136 to the tower silo 12 with the inlet 14 illustrated in FIG. 4A.

Figure 8:
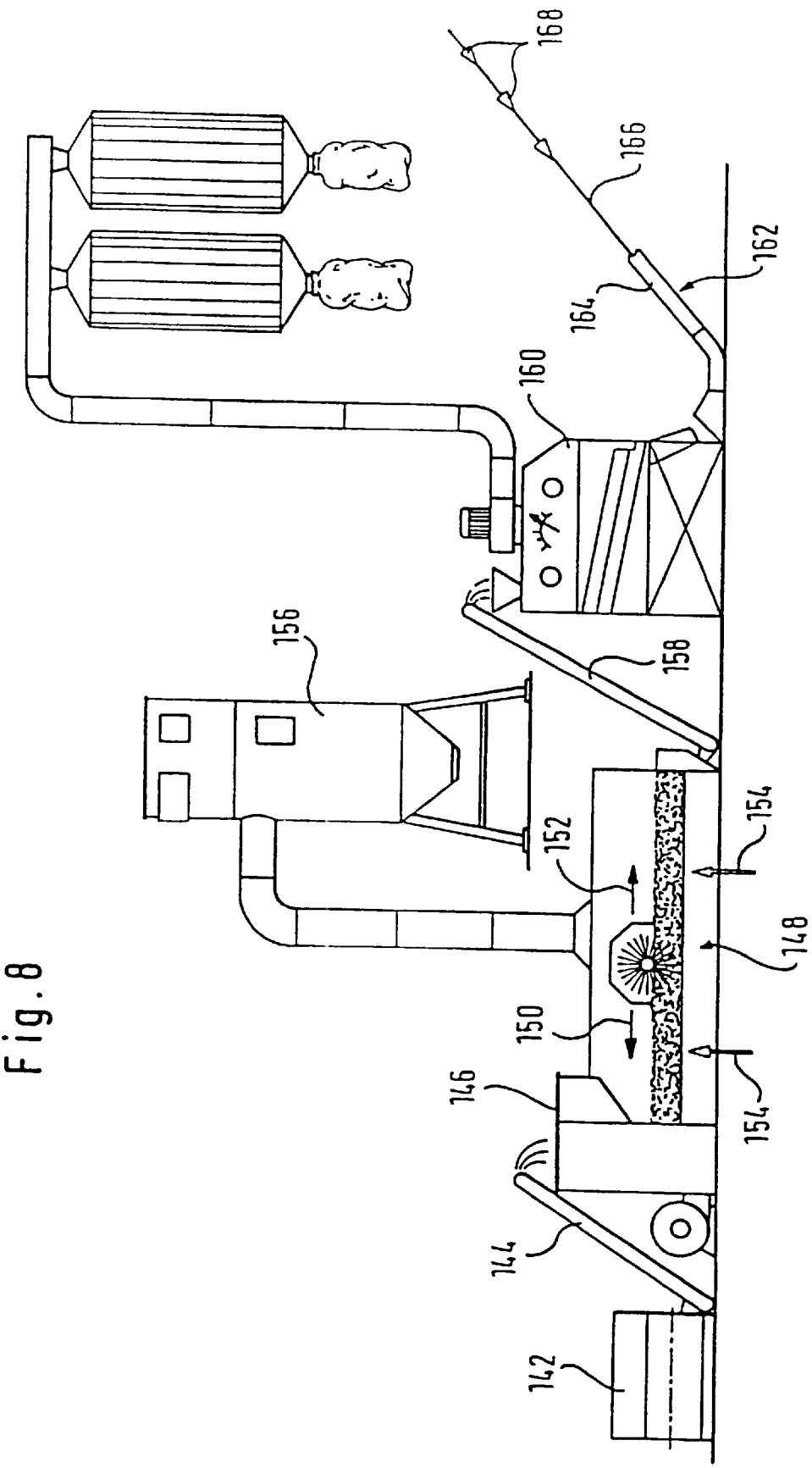
FIG. 8 illustrates the preparation of the additives.

FIG. 8 illustrates the preparation of the second blending component, i.e. the fiber material. It shows the mill or a defibrator unit 142, to which the non-chopped harvest is supplied in the form of bales. There they are ground to a linear particle length of about 3 mm. The ground material is still as moist as it was when it was harvested. From the mill the ground material reaches the inlet funnel 146 of a drying plant 148 by means of a conveyor screw 144. The ground material is transported through the drying plant and at the same time loosened by means of a loosening device reciprocating in the direction of arrow 150–152. The transported material is passed through by dry air from the bottom in the direction of arrow 154. The dry air takes up the moisture from the ground material. The damp air reaches the filter plant 156 in which entrained droplets of dust and condensate are filtered out. The air which is still damp can be re-introduced in the process at any desired point, in particular in the direction of arrow 154. The dried ground material is then transported to the entrance of the fraction screen arrangement 160 with a moisture content of 1% by wgt through a conveyor screw 158. In the fraction screen arrangement 160 the fraction useful for the blending component fiber material is screened out and the rest is discharged. The rest can be reused for example within the framework of gaining energy. The useful fraction is finally transported to the entrance of the tower silo 18 according to FIG. 4A via a cable conveyor device 162. The cable conveyor device 162 comprises a pipeline 164 with a reciprocating or constantly rotating conveyor rope 166. Pulling knubs 168 are attached to the conveyor rope 166. Due to the fact that a relative small quantity of dust is produced, this cable conveyor device 162 has proved to be advantageous.

Examinations have shown that the section produced in this way is resistant to a temperature range between −30° C. to +40° C. and above, and thus meets the requirements for the manufacture of windows and doors. The process of "intrusion" builds up a high pressure, which provides a homogeneous section material even when the starting material is highly inhomogeneous.

The following is a description of another inventive procedure with reference to FIGS. 10–17. Analogous parts are indicated with the same drawing references as in the figures that have been mentioned up to now, but with the suffix x.

Figure 10:
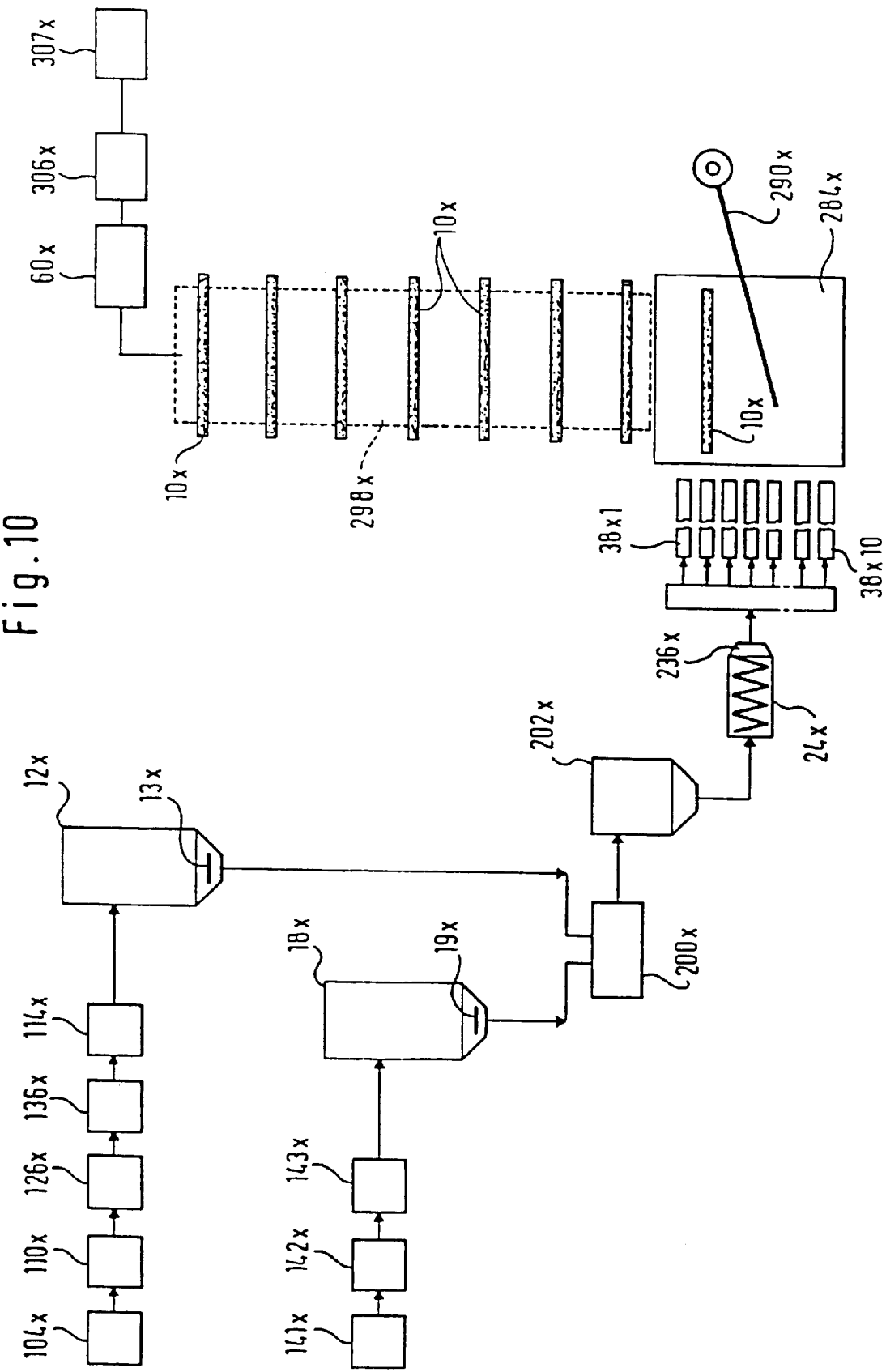
FIG. 10 shows a flow chart of another embodiment of inventive process.

FIG. 10 is a general view of the alternative procedure. A bale scarifier is designated 104x to which plastics bales from the dual system Germany (DSD) are added. From the bale scarifier 104x, the plastics parts, of the respective bales reach a screen-out device 110x in which heavy coarse parts, e.g. locking tin caps of plastics bottles, are sorted out. From the screen-out device 110x, the plastics constituents partly cleaned. reach a reduction device 126x. In said reduction device 126x, the plastics constituents are reduced to a particle size of approximately 20 mm. The thus reduced plastics parts reach a drying plant 136x, in which the particles are dried to a water content of approximately 1% by wgt. The dried plastics parts then enter a magnetized precipitation device 114x in which possible ferromagnetized constituents are deposited. Eventually the plastics parts enter a tower silo 12x.

FIG. 10 further shows a delivery station 141x to which straw is supplied in the form of bales with the bales being torn apart. From the delivery and tearing station 141x, the straw reaches the defibrator device 142x in which the non-chopped harvest is reduced by grinding to approximately 3 mm linear particle length. The thus reduced straw then enters a drying device 143x in which it is passed through by dry air and dried to a water content of approximately 1% by wgt to finally enter a tower silo 18x. The individual steps of treatment 104x–12x and 141x–18x can be varied, for example according to the description of the above mentioned embodiment. The steps of treatment to be applied depend on the nature of the respectively delivered first and second blending components, which are introduced to the procedure in 104x, 141x, respectively.

Figure 11:
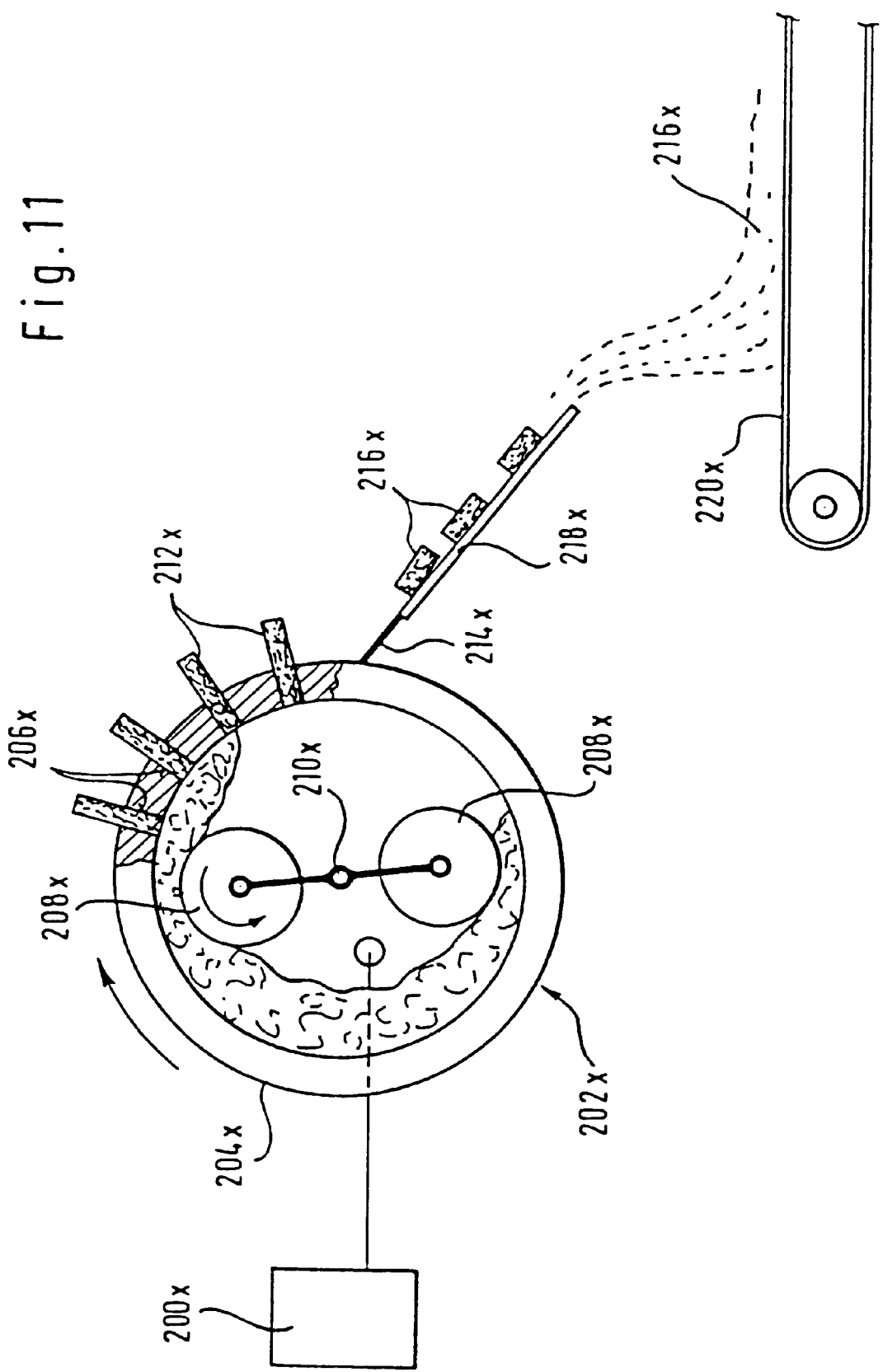
FIG. 11 illustrates a device for pelletizing for the use in the process according to FIG. 10.

From the tower silos 12x and 18x, which can be equipped with loosening devices 13x and/or 19x for homogenizing the material discharge the two blending components stored in the respective tower silos enter a premixing device 200x and from there they enter a die device 202x for the production of pellets. The die device 202x is schematically shown in FIG. 11. It comprises a rotating die drum 204x with a plurality of die borings 206x distributed over the circumferential surface. The mixed material introduced in the die drum 204x from the premixing device 200x is subjected to a treatment of fulling and kneading by milling and grinding rolls 208x, if necessary by adding heat, within the die drum 204x. The milling and grinding rolls 208x revolve about an axis 210x at the inner circumference of the die drum 204x and rotate about their own axis. By means of fulling and kneading the mixed material achieves a temperature within the order of 105° C.–130° C. (provided that the main constituents of the blending material plastic are polyethylene and polypropylene).

Thus the plastics parts are at least partially thermally plasticised and mixed with the straw fibers. The thermally plasticised mixture is pressed through the die borings 206x so that strands 212x form at the exit of the borings 206x. In the course of the revolution of the die drum 204x, these strands 212x are cut off by a scraping knife 214x and are thus formed to individual pellets. Via a chute 218x contiguous to the scraping knife 214x, the pellets 216x reach a conveyor belt 220x, by which they are supplied to an extruder screw 24x.

Figure 12:
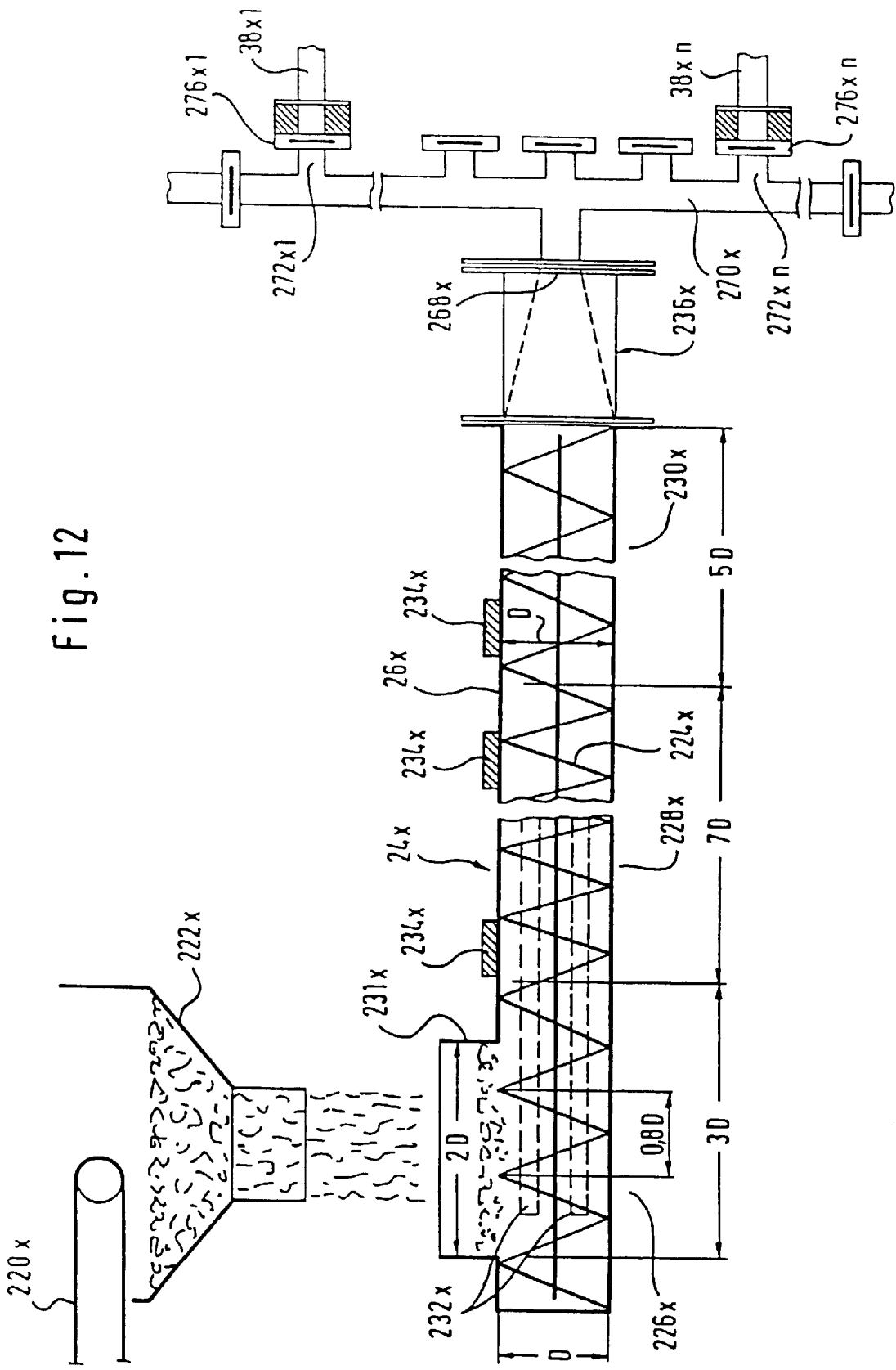
FIG. 12 illustrates an extruder screw for the process according to FIG. 10 with a retention and homogenizing device connected in series and a distributor device.

As shown in FIG. 12, the extruder screw 24x comprises a screw cylinder 26x with an internal diameter D and within this screw cylinder 26x is a single-flighted screw body 224x. In the screw cylinder 26x, the screw body 224x forms a draw-in zone 226x with a length of 3 D, a compression zone 228x with a length of 7 D and a discharge zone 230x with the length 5 D. The pitch amounts to 0.8 D.

From the hopper 222x, the premix is led into a charging shaft 231x which has an extension of approximately 2 D in the axial direction of the screw and an extension corresponding to the diameter D in the direction perpendicular to the drawing plane. In the draw-in area and, if necessary, beyond that, restraining grooves 232x are provided at the inner circumference of the screw cylinder 26x. The restraining grooves 232x have a depth of approximately 3 mm and serve the purpose of preventing a turning of the mixed material filled in with the screw body 224x. The restraining grooves 232x taper off flatly in the axial direction to the screw body 224x towards the right end of the screw cylinder. The screw cylinder 26x is provided with annular heating elements 234x across its axial length. The heating elements 234x can be heated electrically or with steam. They are of particular importance at the onset of work of the extruder screw 24x. During stationary operation they can be switched off under certain circumstances, since the kneading work iself, to which the mixed material is subjected, gives rise to heat.

Figure 13:
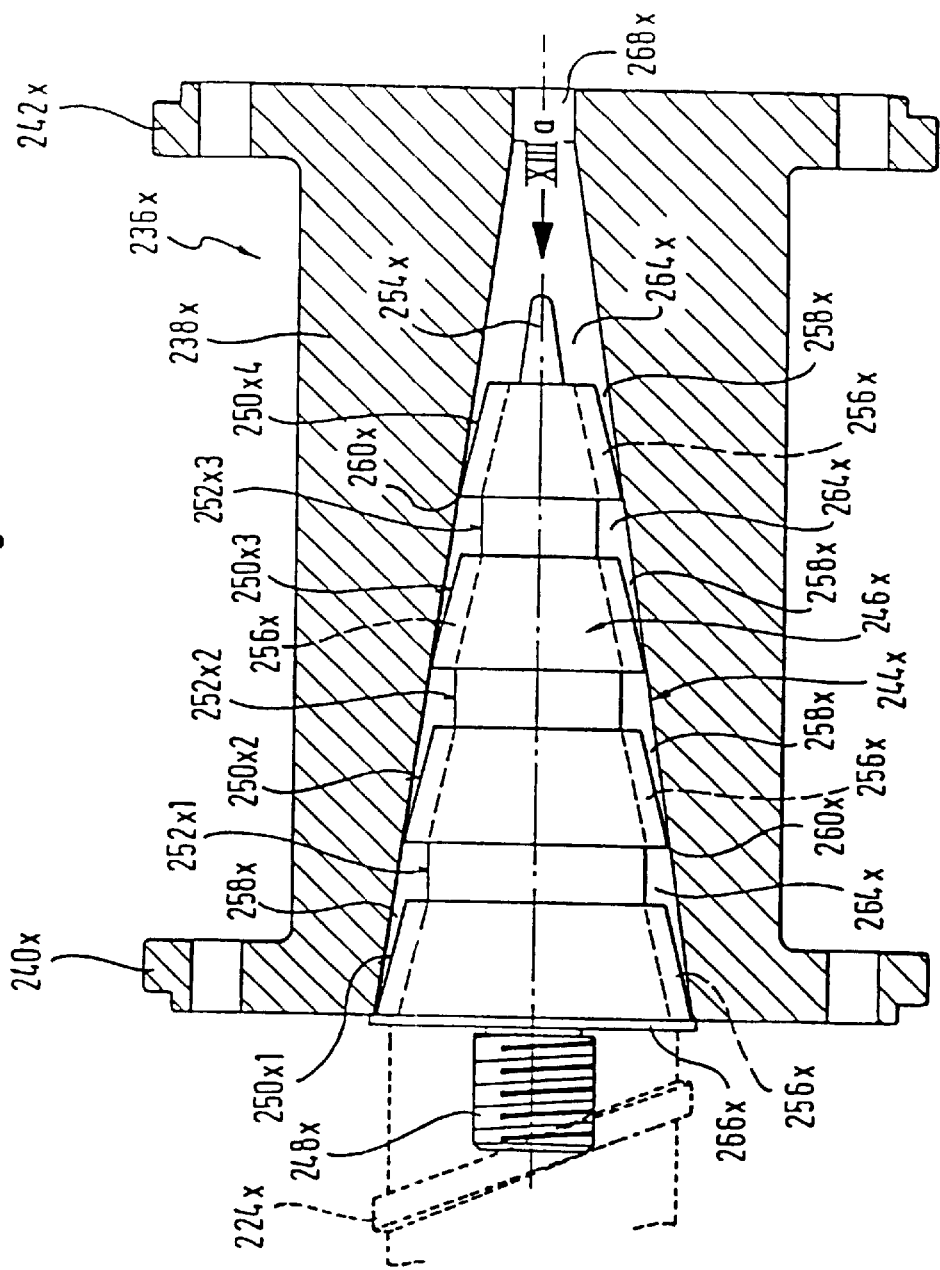
FIG. 13 illustrates details of the retention and homogenizing device according to FIG. 12.
Figure 13A:
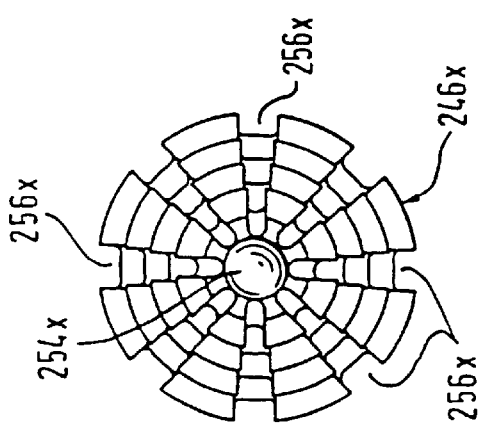
FIG. 13a illustrates an end view of a retention body according to FIG. 13 in the direction of arrow XIIIa of FIG. 13.

A retention and homogenizing device 236x, which is illustrated in more detail in FIGS. 13 and 13a, is contiguous to the screw cylinder.

The retention and homogenizing device 236x comprises a flow pipe 238x with a connecting flange 240x to establish a connection to the screw cylinder 26x and a second connecting flange 242x to establish a connection with a distributor device which will be described later on. The flow pipe 238x has a conic pass-through channel 244x with a truncated cone body 246x inside. The truncated cone body 246x can be released from the screw body 224x by means of a screw plug 248x which is fastened with the screw body 224x for the purpose of turning with the same. The truncated cone body 246x is formed with steps. Its surface shell is composed of conic sections 250x1, 250x2, 250x3 and 250x4 as well as of cylindrical sections 252x1, 252x2 and 252x3 in between, and a tip 254x. In the area of the conic section 250x1–250x4, grooves 256x are formed. The depth of the grooves 256x is sized so that their base tapers off evenly with the adjacent cylindrical sections 252x1, 252x2 and 252x3. With their upstream ends, the conic sections 250x1 are directly adjacent or in contact with the inner circumference of the conic pass-through channel 244x. Gaps 258x are defined between the conic sections 250x1–250x4 and the conic pass-through channel 244x.

The axial length of the conic sections 250x1–250x4 is greater than the axial length of the cylindrical sections 252x1–252x3. The axial length of the conic sections and the cylindrical sections is preferably the same. The narrowest point 260x of the cross-section of the grooves 256x approximatively corresponds to the largest foreign bodies to be expected after the plastics waste has been previously cleaned.

Due to the interaction with the grooves 256x intense shear zones are formed in the gaps 258x between the conic sections 250x1–250x4 and the inner circumference of the conic pass-through channel 244x. Contiguous to the intense shear zones 258x are relaxation zones 264x in the area of the cylindrical sections 252x1–252x3 as well as in the area of the tip 254x. The axial position of the truncated cone body 246x within the pass-through channel 244x can be adjusted by one or several washers 266x at the point of connection between the truncated cone body 246x and the screw body 244x. Thus the distance of the upstream ends of the conic sections 250x1–250x4, such ends having a larger diameter, and the inner circumference of the conic pass-through channel 244x can be varied. The truncated cone body 246x can be composed of individual conic and cylindrical washers.

The material thermally plasticised by the screw-type extruder 24x is transported into the conic pass-through channel 244x by means of the feed pressure prevailing at the exit of the screw-type extruder 24x. In the upstream area of the first conic section 250x1, the overall thermally plasticised matter is taken up by the grooves 256x and transported through them. Along the conic section 250x1 the matter is mixed peripherally, radially and axially within the intense shear zone 258x. The mixing increases as the width of the gap of intense shear zone 258x increases. Disturbing elements, non-plasticised material and thermally damaged material are constantly taken through the gap area 258x (intense shear zone) opening in the direction of extrusion and thus no deposits or obstructions occur. Thus production losses are avoided.

In the relaxation zone 264x the plastics melt is further mixed with a low amount of shearing stress. In the area of the other conic and/or cylindrical sections these processes are repeated.

Of considerable advantage is the continuous reduction of the flow cross-section caused by the conical shape of the pass-through channels 244x and of the truncated cone body 246x. In the direction of extrusion, successive free cross-sections are reduced with the result of an increase in material pressure and temperature which, in turn, causes an increase in the speed of flow and an improvement of flowability of the plastics melt. On the other hand, the speed of circumference decreases in the direction of extrusion as the diameter decreases, consequently the shearing effect also decreases in the direction of extrusion. Thus it becomes possible that plastics compositions which are particularly sensitive to heat and have bad properties of flow can be distributed without thermal damage and homogenized materially. Due to the fact that the ground surfaces of the grooves 256x evenly pass over into the circumferential surfaces of the cylindrical sections 252x1–252x3, dead corners are avoided. After all, the quality of the thermally plasticised matter available at the exit of the retention and mixing device can be improved in particular with respect to the homogeneity and the freedom from thermally damaged constituents. This enables the possibility of incorporating natural substances in particular natural fibers such as straw fibers. In the case of a heterogeneous plastics melt a larger portion of the plastics mixture melts and the material homogeneity of the plastics melt is enhanced. By axially adjusting the truncated cone body, the conditions of treatment can be adapted to the respective plastics mixture. Another possibility is the variation of the size of the grooves 256x. In enlarging their cross-section to a diameter greater than that of the hard foreign substances to be expected, an attaching of the disturbing substances can be avoided.

A particular sensitive adaption to the various conditions of procedure can be made possible by the fact that both the cylindrical and the conic sections can be changed in shape and length. It is particularly advantageous when the truncated cone body 246x is composed of individual exchangable sections.

The effect of homogenizing of the retention and homogenizing device allows the length of the screw-type extruder to be shortened, thus reducing the investment cost attributable to the screw-type extruder.

The retention and homogenizing device is responsible for the altitude of pressure at the entrance of the successive preliminary section forming ducts.

Figure 14:
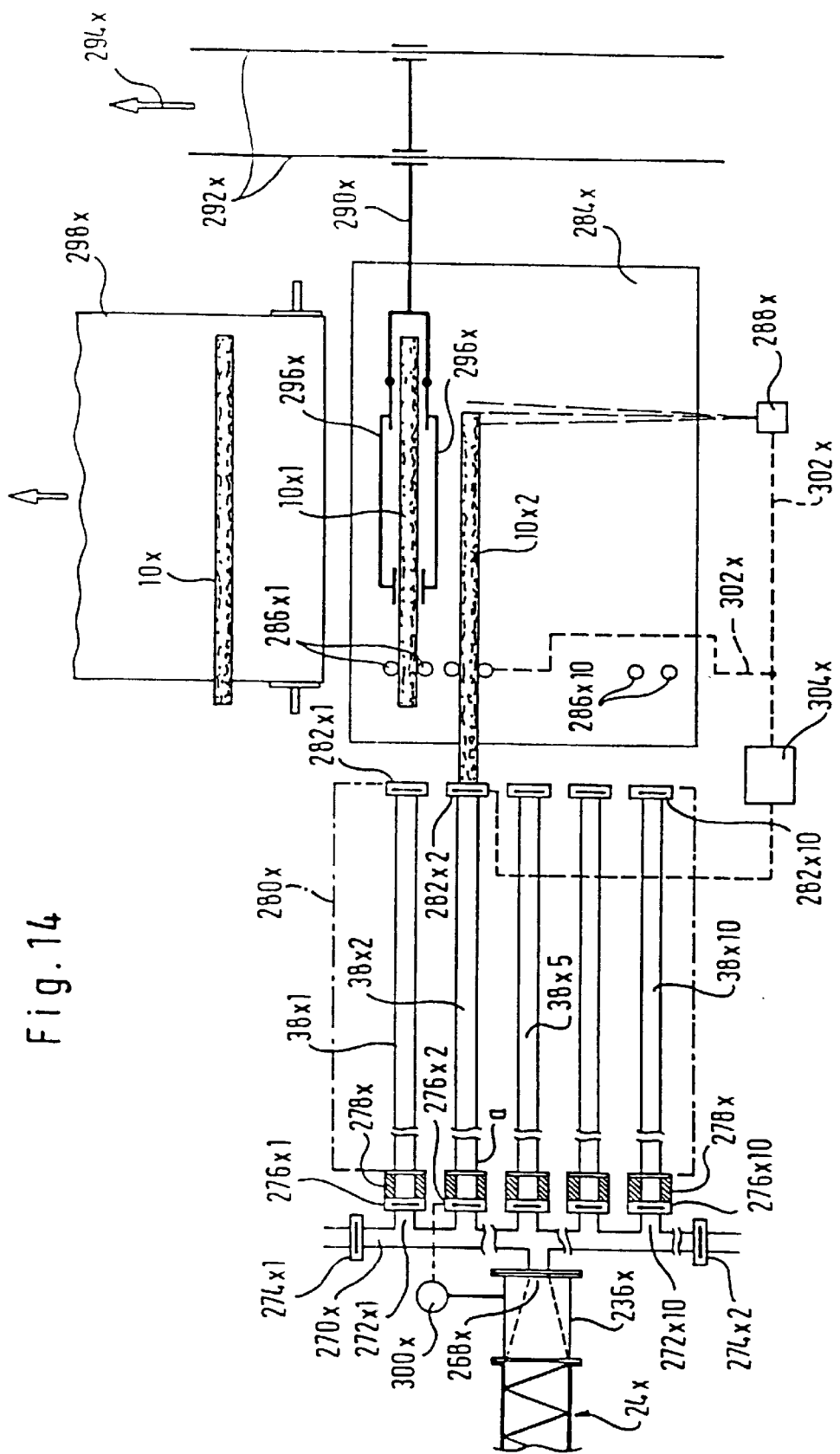
FIG. 14 illustrates a distributor device according to FIG. 12 with preliminary section forming ducts connected in series and a removal station to remove the preliminary sections from the preliminary section forming ducts.

FIG. 14 shows one part of the screw-type extruder 24x and the retention and homogenizing device 236x. The exit of the retention and homogenizing device 236x is designated 268x. In FIG. 13 the flange was designated 242x, and is now connected to a distributer mains 270x. A plurality of, e.g. 10, duct-charging connections 272x1–272x10 are distributed over the length of the distributor mains 270x. Cleaning valves 274x1 and 274x2 are mounted on both ends of the distributor mains 270x. A preliminary section forming duct 38x1–38x10 is connected to each of the duct-charging connections 272x1 via a respective connecting valve 276x1–276x10. The connecting valves 276x1–276x10 are connected to the respective preliminary section forming duct 38x1–38x10 by a thermal insulation 278x. The preliminary section forming ducts 38x1–38x10 are adapted in a cooling bath 280x in a stationary manner. Slide gates 282x1–282x10 are attached to the ends of the preliminary section forming ducts 38x 1–38x10. Contiguous to the slide gates 282x1–282x10 is a place of deposit 284x which is even with the ground surface of the preliminary section forming ducts 38x1–38x10. For every preliminary section forming duct 38x1–38x10, a group of withdrawal rollers 286x1–286x10 is provided in the area of the place of deposit 284x.

The individual preliminary section forming ducts 38x1–38x10 are charged in the following way:

First of all, we are looking at the uppermost preliminary section forming duct $38x1$. It is assumed that it had already been charged in a previous charging process, and a preliminary section had formed in it, which cooled down and solidified by cooling in a water bath $280x$. As soon as the preliminary section has been sufficiently cooled, first of all the upper cleaning valve $274x1$ is opened for a short period of time so that solidified matter that might be contained in the upper part of the distributor mains $270x$ can be pushed out. Then the connecting valve $276x1$ is opened, while all other connecting valves $276x2$–$276x10$ are closed. Simultaneously the slide gate $282x1$ is opened while all other slide gates $282x2$–$282x10$ are closed. Now the pressure of the melt builds up at the left end of the preliminary section forming duct $38x1$ and can push out the already hardened preliminary section through the slide gate $282x1$. The preliminary section forming duct $38x1$ is then cooled intensely in its portion a, so that a hardened lump rapidly forms at the leading end of the melt just entering the preliminary section forming duct $38x1$. The inflowing melt pushes forward the hardened preliminary section $10x1$, previously formed in the preliminary section forming duct $38x1$. Thus the preliminary section $10x1$ reaches the area of the group of withdrawal rollers $286x1$. As soon as the preliminary section $10x1$ achieves the position of the preliminary section $10x2$ shown in FIG. 14 this position is detected by means of a photo-electric cell $288x$ (attention is to be paid to the fact that the position of the preliminary section $10x2$ does not correspond to the realistic procedure, but is just drawn in to explain the process of detecting). When the photo-electric cell $288x$ determines that the leading end of the preliminary section $10x1$ has entered the area of the light beam emitted by the photo-electric cell $288x$, the preliminary section $10x2$ is withdrawn by means of the group of withdrawal rollers $286x1$. The withdrawal speed of the group of withdrawal rollers $286x1$ is adjusted in such a way that the preliminary section $10x1$ is withdrawn faster than the leading end of the melt, flowing in the preliminary section forming duct $38x1$, migrates to the right. Thus a spacing is formed between the preliminary section $10x1$ withdrawn from the preliminary section forming duct $38x1$ and the leading end of the melt just entering the preliminary section forming duct $38x1$. By virtue of the formation of a spacing, the trailing end of the preliminary section $10x1$ exceeds the slide gate $282x1$ before the just entering melt reaches the location of the slide gate $282x1$ in the preliminary section forming duct $38x1$. Then the slide gate $282x1$ is closed. After closing the slide gate $282x1$ the preliminary section $10x1$ is positioned by the group of withdrawal rollers $286x1$ to the position, in which it is shown in FIG. 14. A conveying appliance $290x$ can be displaced on guide rails $292x$ in direction of arrow $294x$. In FIG. 14, the conveying appliance $290x$ is in a position of receiving as compared to the preliminary section $10x1$ recently pushed out, so that the conveying appliance $290x$ can capture the preliminary section $10x1$ with clamping jaws $296x$ and deposit it on a conveyor belt $298x$. By means of the conveyor belts $298x$, the preliminary sections $10x$ are supplied to further processing operations. On the other hand, the preliminary section forming duct $38x1$ is completely filled after the slide gate $282x1$ has been closed. The duct is filled until a certain cutting-off pressure is achieved at the exit $268x$ of the retention and homogenizing device $236x$ by means of a pressure sensor $300x$. When the cutting-off pressure is achieved, the connecting valve $276x1$ is closed. Then, the melt in the preliminary section forming duct $38x1$ is cooled down in the cooling bath $280x$ during a predetermined time, until this new melt can also be pushed out in the form of a hardened preliminary section.

The insulating element $278x$ is responsible for maintaining a thermal separation between the high temperature of the melt in the duct-charging connection $272x1$ and the intense cooling zone within the cooling bath $280x$.

After the connecting valve $276x1$ has been closed, the screw-type extruder $24x$ continues to transport. Therefore the connecting valve $276x2$ is opened simultaneously with the slide gate $282x2$ and the process previously described for the preliminary section forming duct $38x1$ is now repeated in the preliminary section forming duct $38x2$. Successively all preliminary section forming ducts $38x1$–$38x5$ are recharged with melt while pushing out the respective preliminary section formed in them. The transition from charging one of the preliminary section forming ducts $38x1$ with melt to charging the next preliminary section forming duct with melt can take place very rapidly, so that the constant conveyance of the screw-type extruder $24x$ need not be interrupted. If a delay cannot be prevented, a buffer device can be provided at the end of the screw-type extruder $24x$ or at the end of the retention and homogenizing device $236x$ or in the area of the distributor mains $270x$. The buffer device takes up melt during the closing of all connecting valves and releases the melt after the next connecting valve to be opened has been opened. The buffer device can be formed by a receiver containing a piston which can be displaced against spring pressure. After the preliminary section forming ducts $38x1$–$38x5$ have been recharged, the cleaning valve $274x2$ is opened so that the lower portion of the distributor mains $270x$ is cleaned. After the cleaning process, the preliminary section forming duct $38x10$ is charged while at the same time the preliminary section previously hardened in said preliminary section forming duct $38x10$ is pushed out. Subsequently the preliminary section forming ducts $38x9$–$38x6$ are recharged. This guarantees that the preliminary section forming ducts are not charged with melt that has solidified too early.

The photo-electric cell $288x$ is connected to the groups of withdrawal rollers via a signal line $302x$, so that the required group of withdrawal rollers becomes effective as soon as a preliminary section has reached the position in which the preliminary section $10x2$ is shown according to FIG. 14. Furthermore, the photo-electric cell $288x$ is connected to the slide gates $282x1$–$282x10$ via a delay switch $304x$, so that the required slide gate is brought into closing position when a predetermined amount of time has passed by since the withdrawing process was started by the appropriate group of withdrawal rollers.

FIG. 10 shows the places of deposit $284x$ and the contiguous conveyor belt $298x$. The conveying appliance $290x$ for transferring the preliminary sections $10x$ is only schematically illustrated in FIG. 10. The preliminary sections $10x$ move along the conveyor belt $298x$ transversely to their axial direction. By a correspondingly slow operation of the conveyor belt $298x$, a rest time of approximately 5–10 hours and more is achieved which is required to subject the preliminary sections $10x$ to the shrinkage process which is only then followed by subsequent machining.

In FIG. 10 there can be seen at $60x$ a machining station which can be formed in such way as was described with reference to FIG. 5. A station $306x$ for applying the surface finish layer is contiguous to the machining station $60x$, if desired by connecting an intermediate storage in between. A station $307x$ for the manufacture of frames can be provided contiguous to the station for applying the surface finish layer, if necessary by interconnecting another intermediate storage.

Figure 15:
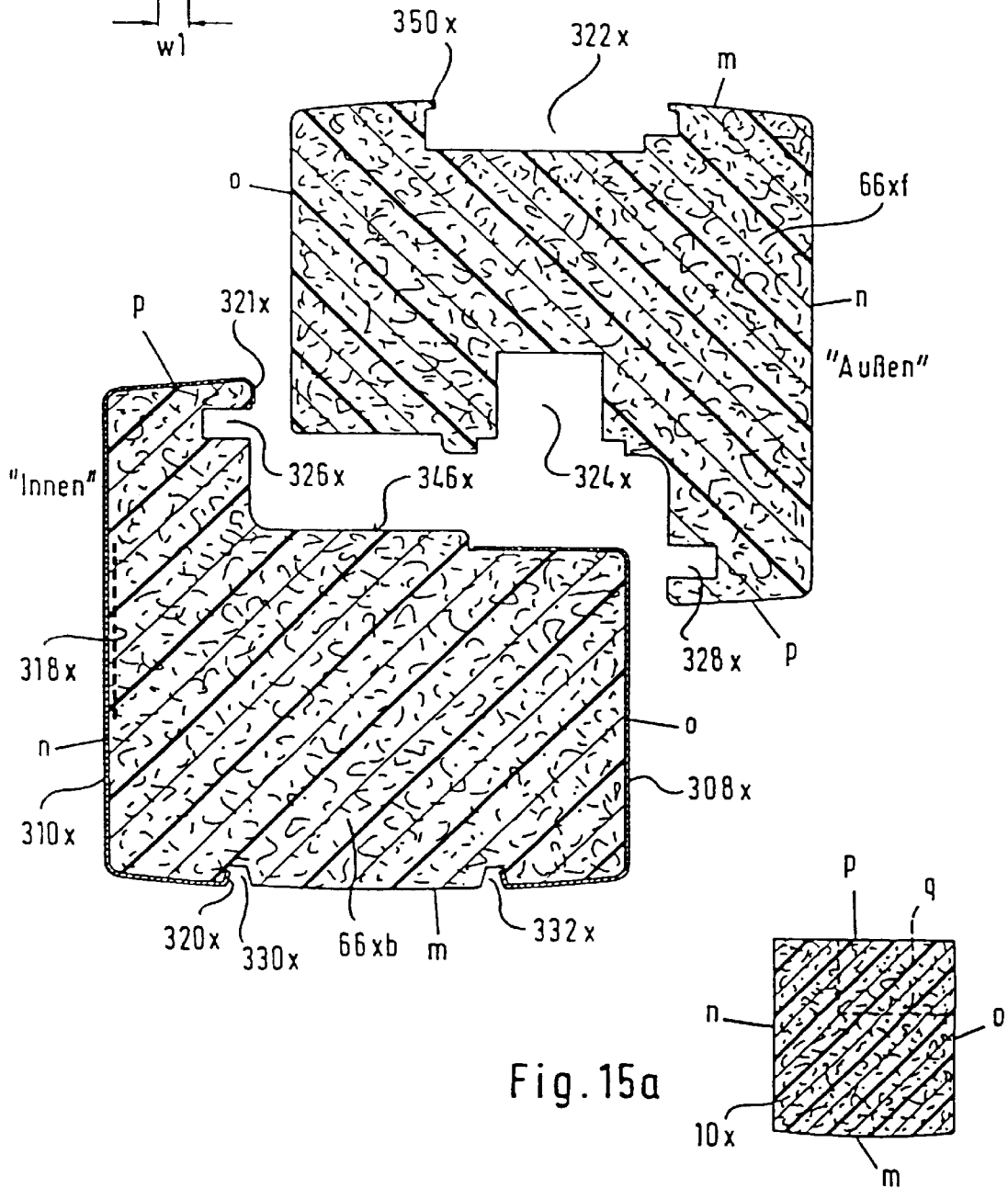
FIG. 15 illustrates the combination of a section for window casements and a section for window frames.
Figure 16:
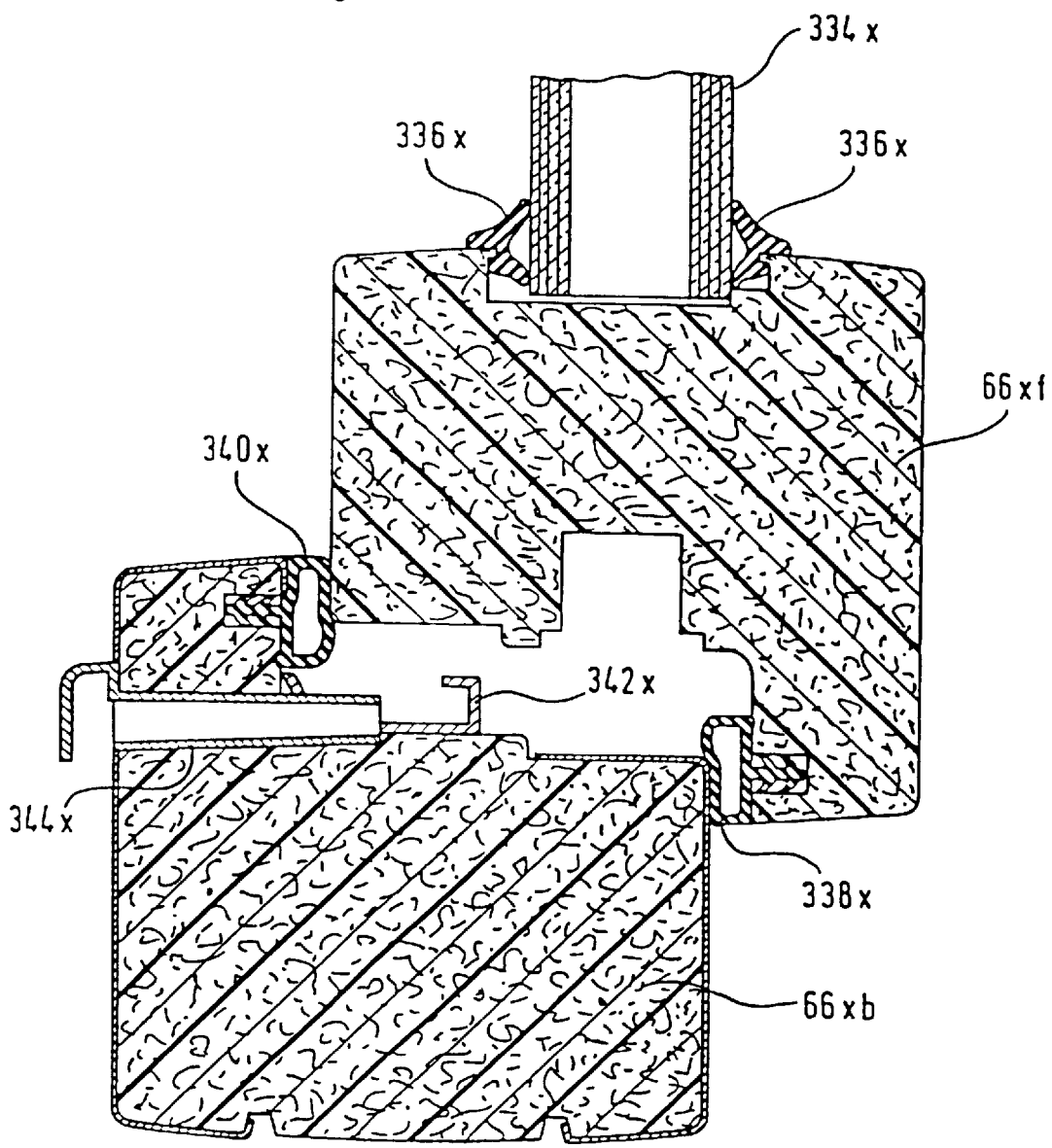
FIG. 16 illustrates the combination according to FIG. 5, equipped with the basic parts of a window.

FIGS. 15 and 16 serve for a better understanding of the coated layer. FIGS. 15 and 16 are illustrations of an intermediate section of a window frame 66xb and an intermediate section of a window casement 66xf. The two intermediate sections 66xb and 66xf are manufactured from one single type of preliminary section 10x, which has been scaled down in FIG. 15a. The preliminary section 10x shown there can also be manufactured with a recess q marked with a dotted line in the preliminary section forming ducts, which reduces the expenditure of the machining process. But the intermediate sections 66xb and 66xf can be manufactured from one and the same type of preliminary section which can clearly be seen when comparing FIGS. 15 and 15a. To clarify which lateral surfaces of the preliminary section 10x correspond to which lateral surfaces of the intermediate sections 66xb and 66xf, the lateral surfaces in FIGS. 15 and 15a are designated with concurrent letters n, m, o and p.

If in FIG. 15 the intermediate section of a window frame 66xb is understood to be the lower window frame side of a window frame and the intermediate section of a window casement 66xf is understood to be the lower window casement side of a window casement, then this leads to an allocation, when fitting in the window, which is characterized by the letterings "exterior" and "interior" as shown in FIG. 15. The section of the window frame 66xb is coated with one section shell 308x and 310x each at the lateral surfaces o and n. The material of the section shells is represented by extracts in FIG. 15b, with 312x being an aluminum layer, 314x a color coat and 316x being a plastics film. The thickness of the aluminum layer is designated w1 and the thickness of the coat of paint is designated w2. The thickness w1 for example amounts to 0.5 mm and the thickness of the coat of paint for example amounts to 0.2 mm. The protective film 316x can be a polyethylene or polypropylene based conventional packaging film or protective. film with a thickness of approximately 0.1 mm.

Figure 17:
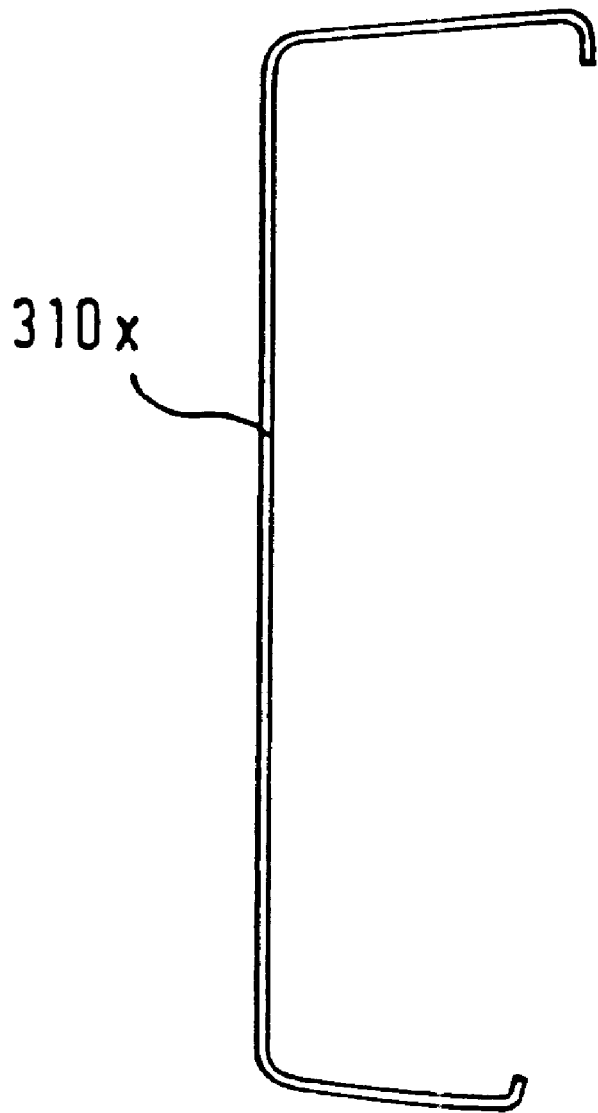
FIG. 17 illustrates partial section shell of a window frame according to FIGS. 15 and 16.

The section shell 310x is shown on its own in FIG. 17. The dotted line 318x in FIG. 15 indicates that the aluminum shell 310x can be glued to the intermediate section 66xb. Moreover it can be seen that the section shell 310x is in positive engagement with the intermediate section 66xb by means of edge flanges 320x and 321x.

The intermediate sections 66xb and 66xf can be machined on all sides or only on certain parts, e.g. in the area of the pane mounting groove 322x of the groove 324x for accommodating the window pane connecting rod and the grooves 326x and 328x for accomodating the sealing edges as well as of the grooves 330x and 332x for positive fixations of the section shells 310x and 308x.

The manufacture of the section shells 310x and 308x starts with a sheet-strip delivered in the form of a coil to the section plant. The aluminum sheet strip, which can already be coated with both the coat of paint 314x and the adhesive layer 318x, if necessary with the protective film 316x, is rolled on the intermediate sections 66xb and 66xf by conventional roller arrangements. It is conceivable to carry out part of the section forming process even before they are brought into contact with the respective intermediate sections 66xb and 66xf.

For a better overview, FIG. 16 indicates how a window pane 334x as well as a glass sealing ledge 336x and a folding room sealing ledge 338x are inserted into the window casement leg 66xf.

Furthermore, it shows a folding room sealing ledge 340x, a rain canal of a window frame 342x and a water drainage 344x on the window frame leg 66xb.

In FIG. 15, it can also be seen that the section shells 308x and 310x do not touch each other so that they cannot form a cold bridge. The surfaces not covered by the section shells, e.g. 346x, are colored by colored pigment additives, in particular soot additives added to the preliminary section material, so that they make up an even optical appearance, no matter if they are machined or not.

FIG. 15 also illustrates that the intermediate section of the window casement leg 66xf has a projecting end 350x in the area of the pane mount groove 322x, so that a positive support is created for the sealing ledge 336x, as can be seen in FIG. 16.

What is claimed is:

1. A process for the production of section material, comprising:
    a) providing a first blending component comprised of thermoplastic plastics waste;
    b) providing a second blending component with a content of additives;
    c) thoroughly mixing and compacting the first and second blending components by thermally plasticising said first blending component, with said second blending component added thereto, to form a strand-forming mixture;
    d) supplying the strand-forming mixture to a point of influx;
    e) from said point of influx, introducing the strand forming mixture into a distribution mains connected to a plurality of preliminary section forming ducts via a corresponding plurality of connecting valves, said distribution mains having an inflowing end for the strand-forming mixture, an end remote from said inflowing end and a longitudinal extent therebetween, said connecting valves being distributed between the inflowing end and the remote end in the longitudinal direction of said distribution mains;
    f) cleaning the distribution mains by opening a cleaning valve located at the remote end thereof;
    g) charging the plurality of preliminary section forming ducts connected to said distribution mains with the strand-forming mixture by opening the respective connecting valves successively beginning at the remote end of said distribution mains and progressing to the inflowing end; said strand-forming mixture being introduced, under pressure, into each preliminary section forming duct until the duct is filled up and the strand-forming mixture is shaped to form a thick-walled preliminary section;
    h) at least partially hardening the preliminary section by cooling;
    i) removing the preliminary section as a longitudinal part from the preliminary section forming duct with a length corresponding to the length of the preliminary section forming duct;
    j) providing a rest time for shrinkage of the preliminary section;
    k) after said rest time, shaping the preliminary section at least in part by machining at least part of the circumference of the preliminary section to form an intermediate section; and
    l) coating the intermediate section on at least a part of its section circumference with a surface finishing layer of coating material.

2. The process according to claim 1, wherein said thermoplastic plastics waste is a member selected from the group consisting of industrial, local and domestic plastics waste and mixtures thereof.

3. The process according to claim 1, or claim 2, wherein said thermoplastic plastics waste is comprised mainly of a member selected from the group consisting of polyolefin-based and ABS-based plastics waste.

4. The process according to claim 1, wherein said thermoplastic plastics waste is comprised mainly of foils or waste consisting of thin films.

5. The process according to claim 1, wherein the thermoplastic plastics waste is provided in the form of bales.

6. The process according to claim 1, wherein said thermoplastic plastics waste is comprised of extracted fractions of mixed local waste.

7. The process according to claim 1, wherein said thermoplastic plastics waste is comprised of extracted fractions of domestic mixed waste.

8. The process according to claim 1, wherein the plastics waste is subject to a size reduction prior to step c.

9. The process according to claim 7 or claim 8, wherein the plastics waste is reduced to a size of less than 80 mm of maximum length.

10. The process according to claim 7 or claim 8, wherein the plastics waste is reduced to a size of less than 20 mm of maximum length.

11. The process according to claim 1, wherein the plastics waste is subject to at least one cleaning treatment prior to step (c).

12. The process according to claim 11, wherein the at least one cleaning treatment is carried out without any wet washing.

13. The process according to claim 11 or 12, wherein the at last one cleaning treatment is adapted to remove metal particles and other hard-material particles.

14. The process according to claim 1, wherein the plastics waste is dried to a residual moisture of less than 3% by wgt. water content.

15. The process according to claim 1, wherein the plastics waste is dried to a residual moisture of less than 1% by wgt. water content.

16. The process according to claim 14 or claim 15, wherein the plastics waste is subject to a size reduction prior to step c); and
the plastics waste is dried after said size reduction.

17. The process according to claim 16, wherein:
in the course of or immediately after said size reduction a first cleaning treatment is carried out; and
in the course of or after the plastics waste is dried a further cleaning treatment is carried out.

18. The process according to claim 1, wherein the second blending component is at least partly composed of fiber material.

19. The process according to claim 18, wherein said second blending component at least partly comprises an agricultural crop in a ground or fibrous form.

20. The process according to claim 18, wherein said second blending component at least partly comprises straw or China grass fiber.

21. The process according to claim 1, wherein said second blending component is reduced to a particle size of a maximum of 5 mm of maximum axial length.

22. The process according to claim 1, wherein said second blending component is reduced to a particle size of a maximum of 3 mm of maximum axial length.

23. The process according to claim 1, wherein said second blending component is dried to a water content of a maximum of 3% by wgt.

24. The process according to claim 1, wherein said second blending component is dried to a water content of a maximum of 1% by wgt.

25. The process according to claim 1, wherein at least one of said first blending component and said second blending component is stored in a storage silo in the immediate vicinity of the place of mixing in step c).

26. The process according to claim 1, wherein said plastics waste is reduced in size and mixed with said second blending component without intermediate reshaping by means of intermediate thermally plasticising, intermediate forming, intermediate cooling and intermediate size reduction.

27. The process according to claim 1, wherein said plastics waste is subjected to compacting pressure prior to step c).

28. The process according to claim 1, wherein said second blending component is subjected to compacting pressure prior to step c).

29. The process according to claim 28, wherein at least one of said first blending component and said second blending component is stored in a storage silo in the immediate vicinity of the place of mixing in step c), whereby the static pressure of said at least one of said first blending component and said second blending component in the respective storage silos serves the purpose of compaction of the respective blending components at the place of mixing.

30. The process according to claim 1, wherein the ratio of the weight between said first blending component and said second blending component is kept at a ratio of 6 parts by weight plastics waste: 1 part by weight additives up to 4 parts by weight plastics waste: 1 part by weight additives.

31. The process according to claim 1, wherein the two blending components are supplied to a screw-type extruder for further mixing and compacting said two blending components and of thermally plasticising said first blending component.

32. The process according to claim 31, wherein the two blending components are subjected to a preliminary mixing stage before being supplied to said screw-type extruder.

33. The process according to 1, wherein by at least partly melting of said first blending component, the blending components are mixed, then pelletized and further processed in pelletized form.

34. The process according to claim 33, wherein an annular die with milling and grinding rolls is used for blending and pelletizing at least the plastics waste component.

35. The process according to claim 33 or claim 34, wherein the pelletized blending components are produced at a temperature from 105° C. to 130° C., and are subsequently cooled in a cooling device to a temperature below 80° C.

36. The process according to claim 35, wherein the pelletized blending components are supplied to a screw-type extruder in a preheated state at a temperature of about 60° C.

37. The process according to claim 36, wherein said pelletized blending components are cooled from their temperature reached during the pelletizing process down to an extruder charging temperature and are supplied to the extruder with this extruder charging temperature.

38. The process according to claim 1, wherein at least one of said first and second blending components is stored in a storage silo with an active stirring and loosening device in the immediate vicinity of the place of mixing in step c), whereby the static pressure of the stored components does not impair the output of the product.

39. The process according to claim 1, wherein the strand-forming mixture is manufactured in a screw-type extruder and through the extruder said mixture is introduced under pressure into said preliminary section forming ducts.

40. The process according to claim 39, wherein said strand-forming mixture is released from said screw-type extruder via a retention zone to said preliminary section forming ducts.

41. The process according to claim 40, wherein the retention zone is constructed as a homogenizing zone.

42. The process according to claim 39, wherein said screw-type extruder is a SINGLE-screw-type extruder.

43. The process according to claim 42, wherein said SINGLE-screw-type extruder includes a THREE-state screw provided with a draw-in zone, a compression zone and a discharge zone.

44. The process according to claim 39, wherein the strand-forming mixture coming from the screw-type extruder is introduced through a thermal insulating portion into each said preliminary section forming duct.

45. The process according to claim 44, wherein in the area of the inflowing end each preliminary section forming duct is, at least at the beginning of introducing a new charge of strand-forming mixture, cooled such that the leading end of the new charge is rapidly through hardened.

46. The process according to claim 45, wherein in the area of the inflowing end each preliminary section forming duct is cooled to a greater extent than in the downstream part of its length.

47. The process according to claim 39, wherein said screw-type extruder is in continuous operation and a buffer volume is provided in the area of the connection of said screw-type extruder to said plurality of preliminary section forming ducts, said buffer volume accommodating the strand-forming mixture whenever the inflow of the mixture to said preliminary section forming ducts is reduced or interrupted.

48. The process according to claim 1, wherein each preliminary section forming duct is kept closed at the end remote from the inflowing end until the preliminary section forming duct is completely charged.

49. The process according to claim 48, wherein the at least partially hardened preliminary section is removed by pushing by means of a pushing force acting from the inflowing end of each preliminary section forming duct.

50. The process according to claim 48, wherein the at least partially hardened preliminary section is removed by pulling out of the preliminary section by means of a pulling force applied downstream at the end remote from the inflowing end.

51. The process according to claim 50, wherein said at least partially hardened preliminary section is removed partly by recharging the preliminary section forming duct at said inflowing end with strand-forming mixture and partly by pulling out said preliminary section that has already been discharged.

52. The process according to claim 51, wherein said at least partially hardened preliminary section is pulled out by means of pull-out rollers.

53. The process according to claim 50 or 51, wherein after the trailing end of an at least partially hardened preliminary section passes an exit-near boundary site of the preliminary section forming duct, the pulling out of said preliminary section is initiated with a speed exceeding the advance of the recharged material within said preliminary section forming duct, thereby producing a space between the trailing end of said discharging at least partially hardened preliminary section and the leading end of the recharged material, in the area of said space the end remote from the inflowing end of the preliminary section forming duct being closed and then the preliminary section forming duct being filled up to a predetermined filling pressure, thereby cutting off the preliminary section forming duct at its inflowing end from the inflow of further strand-forming mixture, and the new charge of strand-forming mixture contained in the preliminary section forming duct being exposed to an at least partial hardening.

54. The process according to claim 53, wherein the preliminary section forming duct is cut off from the inflow of the strand-forming mixture in accordance with a build-up of pressure within the preliminary section forming duct, said pressure build-up being preferably measured at the charging end of the preliminary section forming duct.

55. The process according to claim 53, wherein the withdrawal motion is initiated as soon as the leading end of the preliminary section partly pushed out exceeds a predetermined position, said predetermined position being determined by means of a sensor.

56. The process according to claim 55, wherein the end remote from the inflowing end of the preliminary section forming duct is closed with a preset delay after the onset of the withdrawal motion of the respective preliminary section.

57. The process according to claim 1, wherein said plurality of preliminary section forming ducts are arranged on a circulating support and are subsequently aligned with said point of influx.

58. The process according to claim 1, wherein the preliminary sections are produced in the respective preliminary section forming ducts at a length of approximately 0.5–6 m.

59. The process according to claim 1, wherein the preliminary sections are produced in the respective preliminary section forming ducts at a length of approximately 4.5 m.

60. The process according to claim 1, wherein the preliminary sections are produced with full sections.

61. The process according to claim 1, wherein each preliminary section forming duct is filled at such flow conditions of the strand-forming mixture that, in the presence of elongated fibrous particles in said second blending component, said particles predominantly arrange themselves in the respective longitudinal direction of the section.

62. The process according to claim 1, wherein in the course of leaving the respective preliminary section forming ducts, the preliminary sections are placed on a place of deposit for preliminary sections and, after being completely discharged from the respective preliminary section forming ducts, the preliminary sections are transported to a machining facility and, in so doing, are left to said shrinkage process.

63. The process according to claim 62, wherein at least a part of the transport distance to said machining facility is covered on a distance transverse to the longitudinal axis of said respective preliminary sections.

64. The process according to claim 1, wherein components selected from the group consisting of slip additives, colored pigments and stabilizers are added to the strand-forming mixture.

65. The process according to claim 64, wherein said components are added to said first or second blending component.

66. The process according to claim 64 or claim 65, wherein a black colored pigment is added.

67. The process according to claim 1, wherein said preliminary section is machined in a machining facility with a plurality of rotating machining heads distributed about the circumference of said preliminary section, said machining heads being arranged in series in the passing direction of said preliminary section.

68. The process according to claim 1, wherein the machining capacity supplied to said preliminary section during the machining process is limited to such an extent that the content of thermoplastics in said respective machined preliminary section is substantially not thermally plasticised.

69. The process according to claim 1, wherein the intermediate section obtained from the machining process is supplied to a coating duct via a centering duct adapted to receive the section, said coating duct having an internal size greater by a coating thickness as compared to said preliminary section and having at least one feeding duct for the coating material and optionally, distributor means for the coating material.

70. The process according to claim 69, wherein said coating duct includes distributor means for the coating material.

71. The process according to claim 69, wherein said intermediate section coated with said coating material is subjected to a partial vacuum leveling the surface in a secondary profiling duct after it has been partially hardened.

72. The process according to claim 69, wherein said intermediate section coated with said coating material is subjected to a partial vacuum leveling the surface in a secondary profiling duct after it has been partially hardened by passing through a cooling bath.

73. The process according to claim 1, wherein the coating material is applied with a thickness of approximately 0.1 to approximately 2.00 mm.

74. The process according to claim 1, wherein the coating material is applied with a thickness of approximately 0.7 mm to 0.8 mm.

75. The process according to claim 1, wherein said coating material is an ABS-based polymer.

76. The process according to claim 1, wherein said coating material is a PVC-based polymer.

77. The process according to claim 1, wherein said coating material includes a colored pigment so that the surface of said intermediate section is substantially invisible.

78. The process according to claim 1, wherein said intermediate section is covered with a coating profile on at least a part of its section circumference.

79. The process according to claim 78, wherein a metal section is used as said coating profile.

80. The process according to claim 79, wherein an aluminum section is used as said coating profile.

81. The process according to claim 78, wherein said coating profile comprises a carrier layer and a decorative layer applied to the visible side of the carrier layer.

82. The process according to claim 78, wherein said coating profile comprises an aluminum carrier layer and a paint or laquer decorative layer applied to the visible side of said aluminum carrier layer.

83. The process according to claim 78, wherein said coating profile is provided with a protective film on its visible side.

84. The process according to claim 78, wherein said coating profile is formed from a flat preliminary material strip at the intermediate section.

85. The process according to claim 78, wherein immediately before said coating profile is applied to said intermediate section said coating profile is at least partly preformed and applied to said intermediate section in its preformed state.

86. The process according to claim 78, wherein said coating profile is attached to said intermediate section by a glue.

87. The process according to claim 86, wherein the glue is used as a preformed glue layer.

88. The process according to claim 86, wherein the glue is used as a coat of said coating profile.

89. The process according to claim 86, wherein said glue is used as separate strip material and is applied either on the material of said coating profile or on said intermediate section immediately before said coating profile is combined with said intermediate section.

90. The process according to claim 78, wherein said coating profile is at least partly positively attached to said intermediate section.

91. The process according to claim 90, wherein the coating layer is provided on at least one edge with a positive flange.

92. The process according to claim 78, wherein in the case of sections for window casements or window frames, said coating profile is applied in the form of two partial section shells, which are spaced at the sides of the section of said intermediate section that correspond to an inner circumference and an outer circumference of the respective frames.

93. The process according to claim 78, wherein said coating profile is used on at least one of its profile edges for the formation of holding edges.

94. The process according to claim 1, wherein a final section obtained by applying said coating layer is further processed to form a window or a door, a portion of the section material of said final section being cut for mitering at a respective corner-forming site and being combined with an abutting portion of the section material, which is cut for mitering, by means of at least one screw transversing the miter plane.

95. The process according to claim 94, wherein a hardening sealing material is placed at the mitered surfaces of abutting section material portions before they are screwed together.

96. The process according to claim 1, further comprising forming the selection material as a final section with a fixation groove for a window pane or other filling plate, and connecting the final section with said pane or other filling plate in said fixation groove.

97. The process according to claim 1, wherein fittings are attached to the respective frames by conventional wood screws.

98. The process according to claim 97, wherein said wood screws are introduced through the coating layer into the respective intermediate sections.

99. The process according to claim 1, wherein section areas of the section not covered by the coating layer are left with a surface quality achieved after the preliminary section manufacture or the intermediate section manufacture.

100. The process according to claim 99, wherein during the manufacture of preliminary sections colored pigments are added in such a quantity that the surfaces produced during the formation of preliminary sections, are of uniform color.

* * * * *

UNITED STATES PATENT AND TRADEMARK OFFICE
CERTIFICATE OF CORRECTION

PATENT NO. : 6,237,208 B1
DATED : May 29, 2001
INVENTOR(S) : Meeth

It is certified that error appears in the above-identified patent and that said Letters Patent is hereby corrected as shown below:

<u>Drawings,</u>
Figure 15, "Innen" and Außen" should read -- interior -- and -- exterior --, respectively <u>Column 31,</u>
Line 16, "step c." should read -- step c). --
Line 24, "step (c)." should read -- step c). --
Line 29, "last" should read -- least --

<u>Column 32,</u>
Lines 26 and 27, "waste: 1" should read -- waste : 1 --

<u>Column 35,</u>
Line 44, "laquer" should read -- lacquer --

<u>Column 36,</u>
Line 32, "transversing" should read -- traversing --

<u>Column 1,</u>
Line 16, "thermplastic" should read -- thermoplastic --
Line 20, "component" should read -- components --
Line 22, "said" should read -- the --
Line 27, "frame" should read -- frames --
Line 55, "glueing" should read -- gluing --

<u>Column 2,</u>
Line 47, "process," should read -- process --
Line 48, "process" should read -- process, --
Line 57, "known," should read -- known --

<u>Column 3,</u>
Line 1, "However" should read -- However, --

UNITED STATES PATENT AND TRADEMARK OFFICE
CERTIFICATE OF CORRECTION

PATENT NO.    : 6,237,208 B1
DATED         : May 29, 2001
INVENTOR(S)   : Meeth

It is certified that error appears in the above-identified patent and that said Letters Patent is hereby corrected as shown below:

Column 4,
Lines 7 and 8, "after treatment" should read -- aftertreatment --
Line 41, "¶so" should read -- so --

Column 5,
Line 10, "polyolefine-based" should read -- polyolefin-based --
Line 19, "unforseen" should read -- unforeseen --

Column 6,
Line 23, "stochasticly" should read -- stochastically --

Column 7,
Line 37, "theromplasticising" should read -- thermoplasticising --
Line 52, "polyolefine" should read -- polyolefin --

Column 8,
Line 18, "thermoplastisicing" should read -- thermoplasticising --
Line 23, "Usually" should read -- usually --
Line 36, "if" should read -- If --

Column 9,
Line 60, "being" should read -- is --

Column 11,
Line 4, "distributer" should read -- distributor --
Line 13, "is" should read -- its --
Line 36, "that" should be deleted
Line 38, "said" should read -- the --

Column 12,
Line 26, "the" should read -- such --

Column 13,
Line 8, "polyolefine-" should read -- polyolefin- --
Line 47, "glueing" should read -- gluing --

UNITED STATES PATENT AND TRADEMARK OFFICE
CERTIFICATE OF CORRECTION

PATENT NO. : 6,237,208 B1
DATED : May 29, 2001
INVENTOR(S) : Meeth

It is certified that error appears in the above-identified patent and that said Letters Patent is hereby corrected as shown below:

Column 14,
Line 22, "transversing" should read -- traversing --
Line 50, "always consists the" should read -- always is an --
Line 51, "can" should read -- and can --
Line 56, "utilizition" should read -- utilization --
Line 61, "polyolefines," should read -- polyolefins, --
Line 66, "approxiamtely" should read -- approximately --

Column 15,
Line 5, "polyolefines" should read -- polyolefins --

Column 16,
Line 47, "said" should read -- the --

Column 17,
Line 3, "mitred" should read -- mitered --
Line 28, "of preliminary" should read -- of a preliminary --

Column 18,
Line 31, "polyethelene" should read -- polyethylene --
Line 33, "additves" should read -- additives --
Line 50, "pile" should read -- piled --
Line 56, "said" should read -- the --
Line 58, "prepartion" should read -- preparation --

Column 20,
Line 18, "caterpiller" should read -- caterpillar --

Column 21,
Line 4, "relativley" should read -- relatively --
Line 39, "70, such" should read -- 70. Such --
Line 40, "forming" (second occurrence) should be deleted
Line 61, "micorporous" should read -- microporous --
Line 62, "extisting" should read -- existing --

Column 22,
Line 6, "mitred" should read -- mitered --

UNITED STATES PATENT AND TRADEMARK OFFICE
CERTIFICATE OF CORRECTION

PATENT NO.   : 6,237,208 B1
DATED         : May 29, 2001
INVENTOR(S)  : Meeth

It is certified that error appears in the above-identified patent and that said Letters Patent is hereby corrected as shown below:

Column 23,
Line 50, "cleaned." should read -- cleaned --

Column 24,
Line 21, "axis." should read -- axes. --
Line 60, "iself" should read -- itself --

Column 25,
Line 26, "matively" should read -- mately --

Column 26,
Line 29 "particular" should read -- particularly --; and "adaption" should read -- adaptation --
Line 34, "exchang-" should read -- exchange --
Line 40, "altitude" should read -- magnitude --
Line 46, "distributer" should read -- distributor --

Column 29,
Line 15, "concurrent" should read -- consecutive --
Line 22, "letterings" should read -- labels --; Fig. 15 "Außen" should read -- exterior -- and "Innen" should read -- interior --
Line 34, "tective." should read -- tective --
Line 45, "accomodating" should read -- accommodating --

Signed and Sealed this

Twenty-fifth Day of February, 2003

JAMES E. ROGAN
*Director of the United States Patent and Trademark Office*